(12) United States Patent
Amano

(10) Patent No.: US 8,562,138 B2
(45) Date of Patent: Oct. 22, 2013

(54) PROJECTION DISPLAY DEVICE

(75) Inventor: Ryuhei Amano, Hirakata (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 0 days.

(21) Appl. No.: 13/241,329

(22) Filed: Sep. 23, 2011

(65) Prior Publication Data

US 2012/0019782 A1   Jan. 26, 2012

Related U.S. Application Data

(63) Continuation of application No. 12/244,299, filed on Oct. 2, 2008, now Pat. No. 8,057,044.

(30) Foreign Application Priority Data

Oct. 16, 2007  (JP) ................................. 2007-268836
Aug. 18, 2008  (JP) ................................. 2008-209667

(51) Int. Cl.
   *G03B 21/14*   (2006.01)
   *G02B 5/30*    (2006.01)
   *G02B 27/28*   (2006.01)

(52) U.S. Cl.
   USPC ...................................... 353/20; 359/486.01

(58) Field of Classification Search
   USPC ................... 353/20, 122, 77, 78; 359/486.01, 359/486.03, 483.01, 489.01, 486.02; 349/5, 349/7, 8, 9
   See application file for complete search history.

(56) References Cited

U.S. PATENT DOCUMENTS

| 6,604,829 B2* | 8/2003 | Rodriguez, Jr. ................. 353/79 |
| 2006/0193036 A1* | 8/2006 | Suzuki ........................... 359/364 |
| 2008/0137189 A1* | 6/2008 | Shih .............................. 359/489 |

FOREIGN PATENT DOCUMENTS

| JP | H06-160628 A | 6/1994 |
| JP | 2003121811 A * | 4/2003 |

OTHER PUBLICATIONS

Sunao; JP 2003-121811 A; Machine translation in English.*

* cited by examiner

*Primary Examiner* — William C Dowling
*Assistant Examiner* — Ryan Howard
(74) *Attorney, Agent, or Firm* — Marvin A. Motsenbocker; Mots Law, PLLC

(57) ABSTRACT

In a projection display device, a polarization converting element is provided between an imager and a refracting optical system for converting a polarization direction of light after modulation into a direction radially extending from the center of the optical axis of the refracting optical system. Light transmitted through the polarization converting element is incident onto the refracting optical system in a state of P-polarized light or a state close to the state of P-polarized light. Thereby, the transmittance of light through the refracting optical system is made substantially uniform and increased.

5 Claims, 19 Drawing Sheets

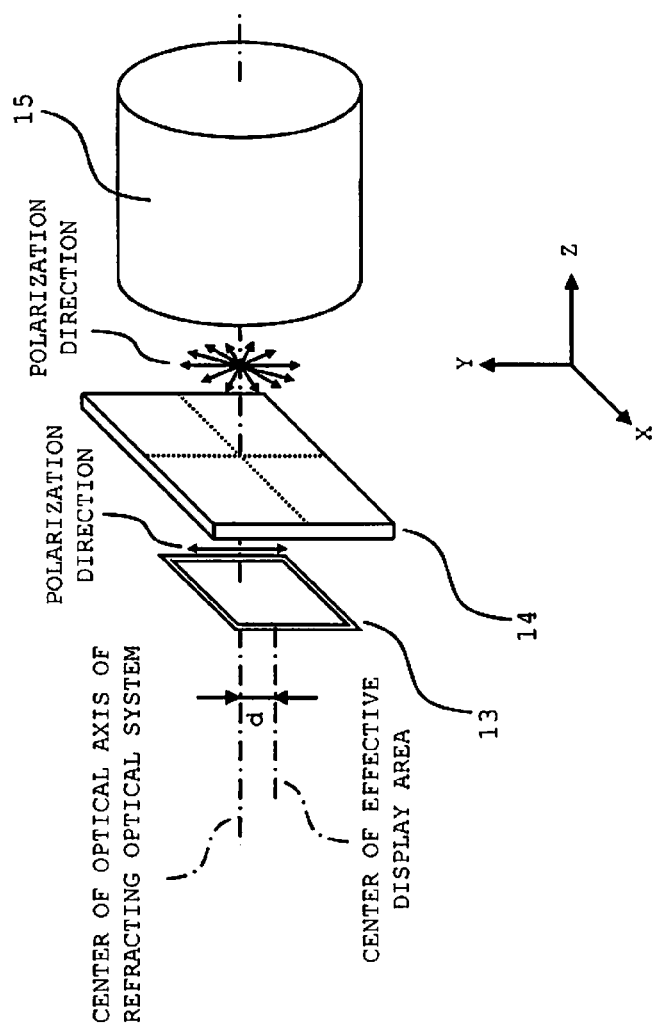
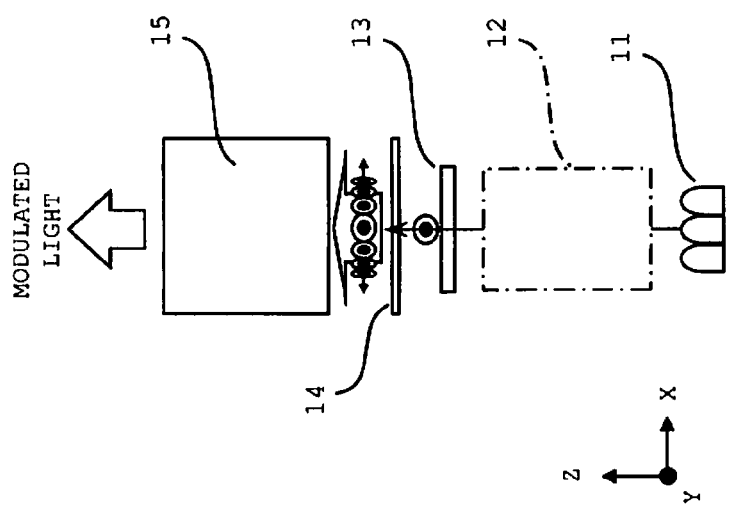

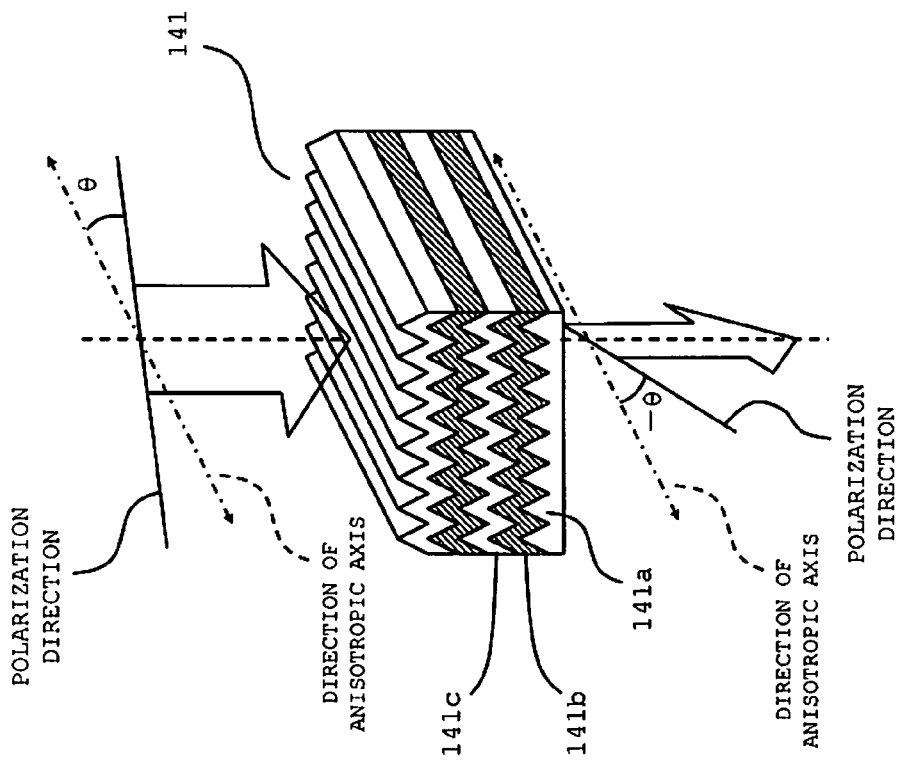

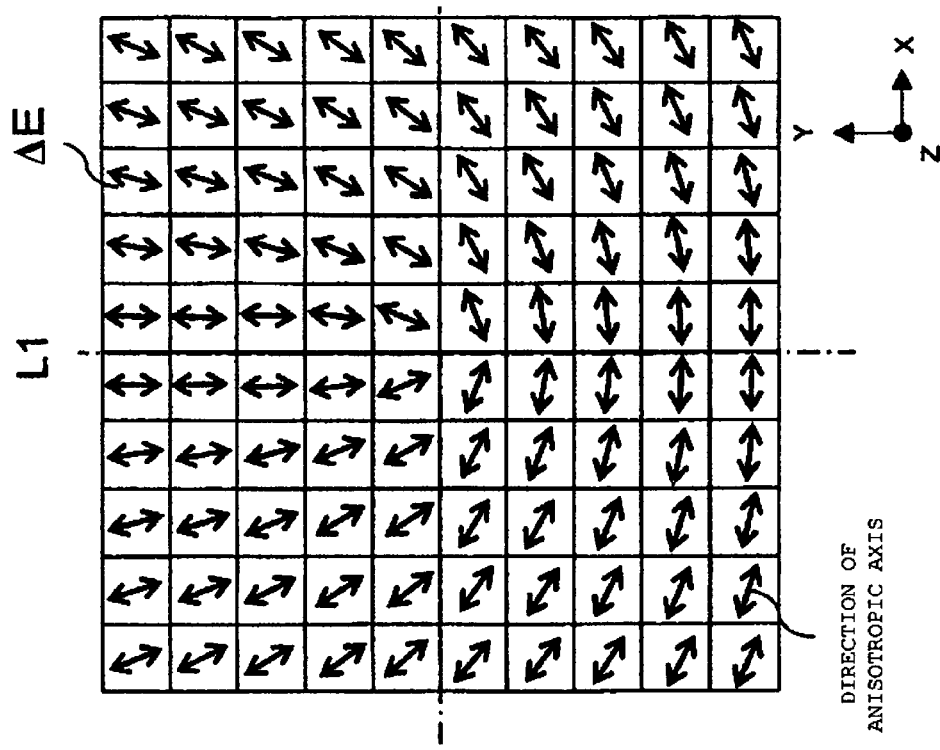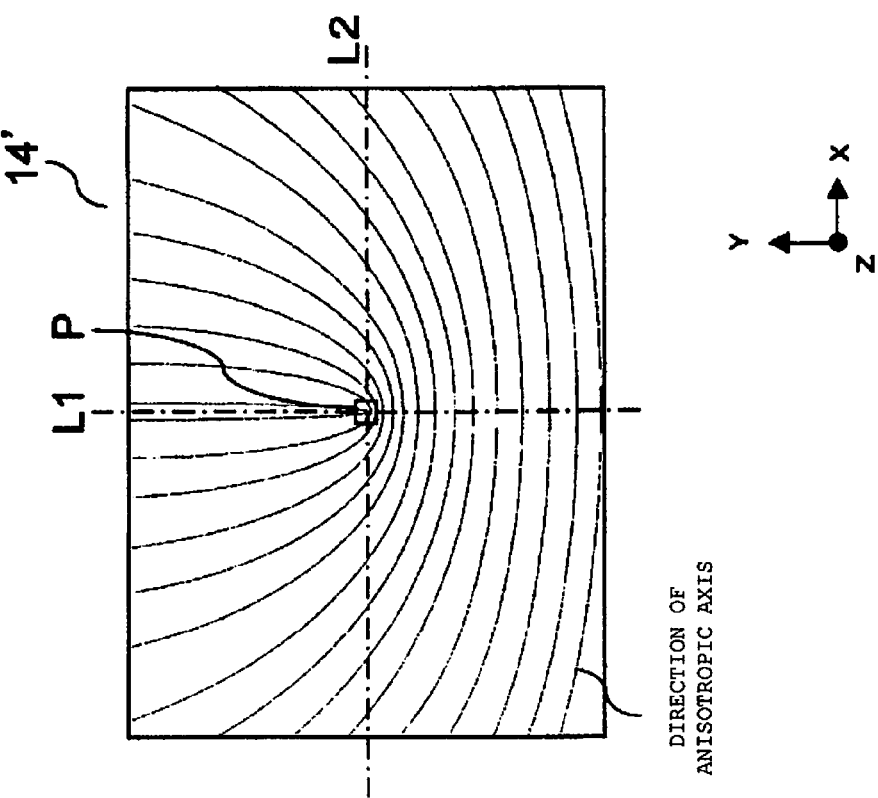

G LIGHT

R LIGHT, B LIGHT

R LIGHT, B LIGHT, G LIGHT

R LIGHT, B LIGHT, G LIGHT

PROJECTION DISPLAY DEVICE

CROSS REFERENCE TO RELATED APPLICATION

This application is a continuation of application Ser. No. 12/244,299, filed on Oct. 2, 2008 now U.S. Pat. No. 8,057,044, which claims priority based on 35 USC 119 from prior Japanese Patent Applications No. 2007-268836 filed on Oct. 16, 2007 and No. 2008-209667 filed Aug. 18, 2008, the entire contents of which are incorporated herein by reference.

BACKGROUND OF THE INVENTION

1. Field of the Invention

The present invention relates to a projection display device for enlarging and projecting an image on an imager onto a projection plane.

2. Disclosure of Related Art

Currently, a projection display device (hereinafter, called as a "projector") for enlarging and projecting an image on an imager (such as a liquid crystal panel) onto a projection plane (such as a projection screen) has been commercialized and widely spread. In the projector of the above type, for instance, three transmissive liquid crystal panels are used as imagers. Light of red, green and blue that has been modulated by the respective corresponding panels is combined by a dichroic prism, and the combined light is projected onto the projection screen by a projecting optical system.

In the above arrangement, normally, the light of the respective colors transmitted through the dichroic prism is respectively linearly polarized light which is oscillated in only one direction. If, however, the light of the respective colors is incident onto the projecting optical system in the above state, there occurs the following drawback that the intensity distribution of light transmitted through the projecting optical system (i.e. a lens group) may be made non-uniform.

Specifically, the transmittance of light with respect to a lens is increased, as the light is incident onto an incident surface of the lens in a state of P-polarized light; and on the other hand, the transmittance is decreased, as the polarization state approaches a state of S-polarized light. P-polarized light is linearly polarized light that is oscillated in a plane (hereinafter, called as a "normal plane") including an incident direction of light, and a normal to an incident point. S-polarized light is linearly polarized light that is oscillated in a plane perpendicularly intersecting with the normal plane.

In the above arrangement, in the case where the polarization direction of light of the respective colors is aligned only in one direction as described above, the polarization direction of light with respect to the normal plane may be changed, as a position of the lens in a circumferential direction thereof is changed. As a result, the light transmittance may be changed depending on the position of the lens in the circumferential direction. Thereby, the intensity distribution of light transmitted through the projecting optical system (i.e. a lens group) may be made non-uniform resulting from non-uniformity in the light transmittance.

The above drawback occurs similarly in the case where light is incident onto a reflection surface. In the case where light is incident onto a reflection surface as S-polarized light, the light reflectance is increased. On the other hand, in the case where light is incident onto the reflection surface as P-polarized light, the light reflectance is decreased. Accordingly, in the case where the projecting optical system further includes a reflecting optical system such as a concave mirror, and light (i.e. linearly polarized light) of the respective colors transmitted through a lens group (i.e. a refracting optical system) is enlarged and projected onto the projection screen by the concave mirror or a like device, the intensity distribution of light may be made more non-uniform resulting from a non-uniformity in the light reflectance with respect to the concave mirror.

The above drawback has been described by taking an example that three liquid crystal panels are used as imagers. The above drawback, however, may also occur in an arrangement that a single transmissive liquid crystal panel is used as an imager, or a like occasion. In other words, the above drawback is a drawback which may equally occur in the case where light of the respective colors is incident onto a refracting optical system (i.e. a lens group) or a reflecting optical system (i.e. a concave mirror) as linearly polarized light which is oscillated in one direction.

In order to eliminate the above drawback, there may be proposed an arrangement, for instance, wherein a quarter wavelength plate is arranged between a dichroic prism and a projecting optical system to allow light of the respective colors to be incident onto the projecting optical system in a state of circularly polarized light or elliptically polarized light. The above arrangement eliminates likelihood that the polarization state of light may be changed depending on the incident position, thereby enabling to suppress non-uniformity in the light transmittance or the light reflectance resulting from a change in the polarization state. As a result, the intensity distribution of light transmitted through the projecting optical system can be made substantially uniform.

However, if light is incident onto a projection lens in a state of circularly polarized light or elliptically polarized light, the light transmittance may be made substantially equal to about an average of light transmittances to be obtained in the case where the light is incident as P-polarized light and in the case where the light is incident as S-polarized light. Similarly, the light reflectance to be obtained in the case where the light is incident onto a concave mirror as circularly polarized light or elliptically polarized light may be made substantially equal to about an average of light reflectances to be obtained in the case where the light is incident as S-polarized light and in the case where the light is incident as P-polarized light.

Accordingly, if a quarter wavelength plate is arranged in the aforementioned manner, the light transmittance with respect to the projection lens, and the light reflectance with respect to the concave mirror may be considerably decreased, as compared with the light transmittance to be obtained in the case where light is incident onto the projection lens as P-polarized light, and the light reflectance to be obtained in the case where light is incident onto the concave mirror as S-polarized light, respectively. In other words, the above arrangement may lower light use efficiency, and impair high luminance performance of a projector, despite an advantage that the uniformity in light intensity distribution is improved.

SUMMARY OF THE INVENTION

An object of the invention is to provide an arrangement that enables to project an image having a uniform brightness onto a projection plane.

An aspect of the invention is directed to a projection display device for enlarging and projecting an image on an imager onto a projection plane. The projection display device according to the aspect of the invention includes: a light guiding optical system for guiding illumination light to the imager; a projecting optical system for enlarging and projecting modulated light modulated by the imager; and a first polarization converting portion, arranged between the imager and the projecting optical system, for converting a polarization direction of the modulated light into a direction radially extending from a center of an optical axis of the projecting optical system.

In the projection display device according to the aspect of the invention, the modulated light is allowed to be incident onto a refracting optical system constituting the projecting optical system in such a manner that the polarization direction of the modulated light radially extends from the center of the optical axis of the projecting optical system. This enables to make the intensity distribution of the modulated light transmitted through the refracting optical system substantially uniform, and at the same time, enhance light use efficiency. Thereby, an image having a uniform brightness can be projected onto the projection plane.

In the above arrangement, preferably, the projecting optical system may include a refracting optical system, and a reflecting optical system for reflecting the modulated light transmitted through the refracting optical system. In the above arrangement, further preferably, the projection display device may further include a second polarization converting portion, arranged between the refracting optical system and the reflecting optical system, for converting the polarization direction of the modulated light in such a manner that the polarization direction of the modulated light is coaxially aligned with a center of an optical axis of the refracting optical system.

In the above arrangement, the polarization direction of the modulated light is allowed to be incident onto the reflecting optical system in such a manner that the polarization direction of the modulated light is coaxially aligned with the center of the optical axis of the refracting optical system. This enables to make the intensity distribution of the modulated light reflected on the reflecting optical system substantially uniform, and at the same time, enhance light use efficiency of the modulated light. Thereby, an image having a uniform brightness can be projected onto the projection plane.

BRIEF DESCRIPTION OF THE DRAWINGS

These and other objects, and novel features of the present invention will become more apparent upon reading the following detailed description along with the accompanying drawings.

FIGS. 1A and 1B are diagrams showing an arrangement of a projector (i.e. an optical system) in accordance with a first embodiment of the invention.

FIG. 3 is a diagram showing an arrangement example of the polarization converting element in the first embodiment.

FIGS. 7A and 7B are diagrams respectively showing a modification of the polarization converting element, and enlargedly showing directions of anisotropic axes in a central part of the polarization converting element in the first embodiment.

Figure 2A:
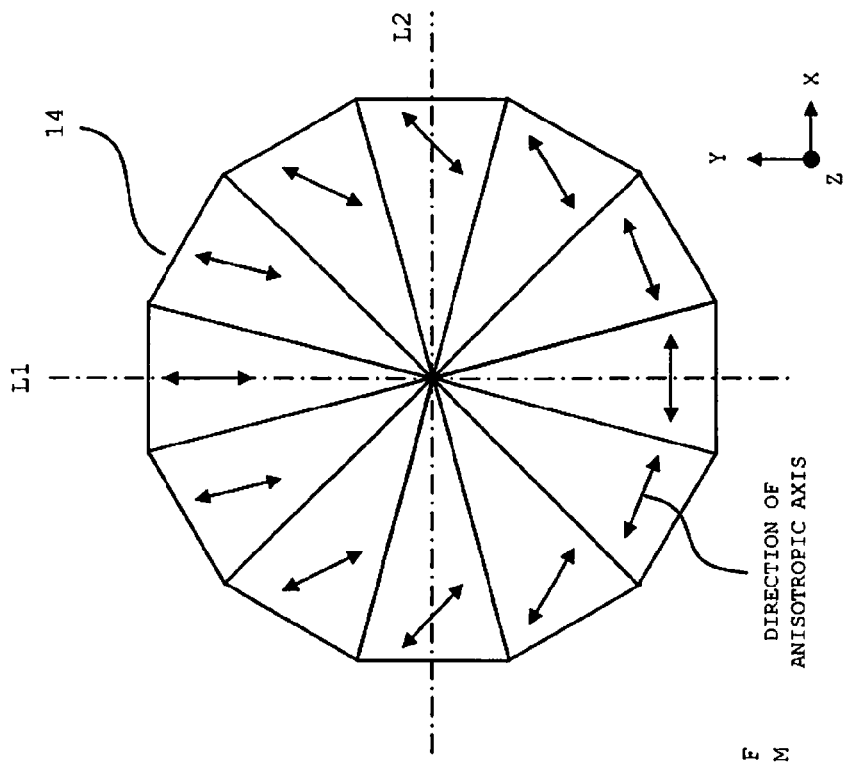
FIGS. 2A and 2B are diagrams respectively showing a polarization state of light in incidence onto a refracting optical system, and an arrangement example of a polarization converting element in the first embodiment.

The drawings are provided mainly for describing the present invention, and do not limit the scope of the present invention.

DESCRIPTION OF PREFERRED EMBODIMENTS

In the following, embodiments of the invention are described referring to the drawings.

First Embodiment

FIGS. 1A and 1B are diagrams showing an arrangement of a projector (i.e. an optical system) in accordance with the first embodiment of the invention. The embodiment is directed to a single-panel projector to which the present invention is applied.

As shown in FIG. 1A, the optical system in accordance with the embodiment includes a light source 11, an illuminating optical system 12, an imager 13, a polarization converting element 14, and a refracting optical system 15 (i.e. a projecting optical system). The light source 11 has multiple LEDs (Light Emitting Diodes) or multiple semiconductor lasers for emitting red light (hereinafter, called as "R light"), green light (hereinafter, called as "G light"), and blue light (hereinafter, called as "B light"). The illuminating optical system 12 converts R light, G light, B light emitted from the light source 11 into illumination light having a uniform brightness and an intended directional characteristic for incidence onto the imager 13.

In this embodiment, all of R light, G light, and B light to be incident onto the imager 13 is linearly polarized light whose polarization direction is aligned in parallel to Y-axis direction in FIG. 1A. In the case where the light source 11 is constituted of multiple LEDs, a PBS (Polarized Beam Splitter) provided in the illuminating optical system 12 aligns the polarization direction of R light, G light, B light in parallel to Y-axis direction. In the case where the light source 11 is constituted of multiple semiconductor lasers, the polarization direction of R light, G light, B light is aligned in parallel to Y-axis direction by adjusting the rotating position of the respective semiconductor lasers about an emission optical axis. In both of the cases, a polarizer (not shown) arranged on the light-incident side of the imager 13 is operable to eliminate fluctuation of the polarization direction.

The imager 13 is constituted of a transmissive liquid crystal panel, and is adapted to modulate R light, G light, B light incident thereon in accordance with an image signal. Specifically, in the case where R light, G light, and B light is emitted from the light source 11 in a time-sharing manner, the imager 13 renders an image in accordance with an image signal corresponding to the light of a target color at an emission timing of the light of the respective colors. In the case where R light, G light, and B light are simultaneously emitted from the light source 11, the imager 13 renders an image in accordance with an image signal corresponding to the light of a target color at a pixel position corresponding to the light of the respective colors. In the latter arrangement, a color filter array for correlating light of the respective colors to the pixel positions is arranged on the imager 13.

R light, G light, B light (i.e. modulated light) modulated by the imager 13 is incident onto the polarization converting element 14 via an outputside polarizer (not shown). In the incidence, the polarization direction of R light, G light, B light (i.e. modulated light) is aligned in parallel to Y-axis direction in FIG. 1A.

The polarization converting element 14 converts the polarization direction of R light, G light, B light (i.e. modulated light) in such a manner that the polarization direction of the modulated light extends radially from the center of the optical axis of the refracting optical system 15. The refracting optical system 15 has multiple lenses in the optical axis direction. R light, G light, B light (i.e. modulated light) whose polarization direction is converted by the polarization converting element 14 is enlarged and projected onto a projection screen via the refracting optical system 15.

As shown in FIG. 1B, the imager 13 is arranged at such a position that the center of an effective display area thereof is displaced from the center of the optical axis of the refracting optical system 15 in Y-axis direction by the distance (d). Accordingly, R light, G light, B light (i.e. modulated light) modulated by the imager 13 is incident onto the refracting optical system 15 at a position displaced from the center of the optical axis of the refracting optical system 15 by a distance corresponding to the displacement.

FIG. 2A is a diagram schematically showing a positional relation between an incident-side lens surface 15a of the refracting optical system 15, and the imager 13, as well as a polarization direction of R light, G light, B light (i.e. modulated light) in incidence onto the incident-side lens surface 15a. As shown in FIG. 2A, R light, G light, B light (i.e. modulated light) modulated by the imager 13 is incident onto the incident-side lens surface 15a of the refracting optical system 15 in a state that the polarization direction of the modulated light radially extends from the center of the optical axis of the refracting optical system 15.

Figure 2B:
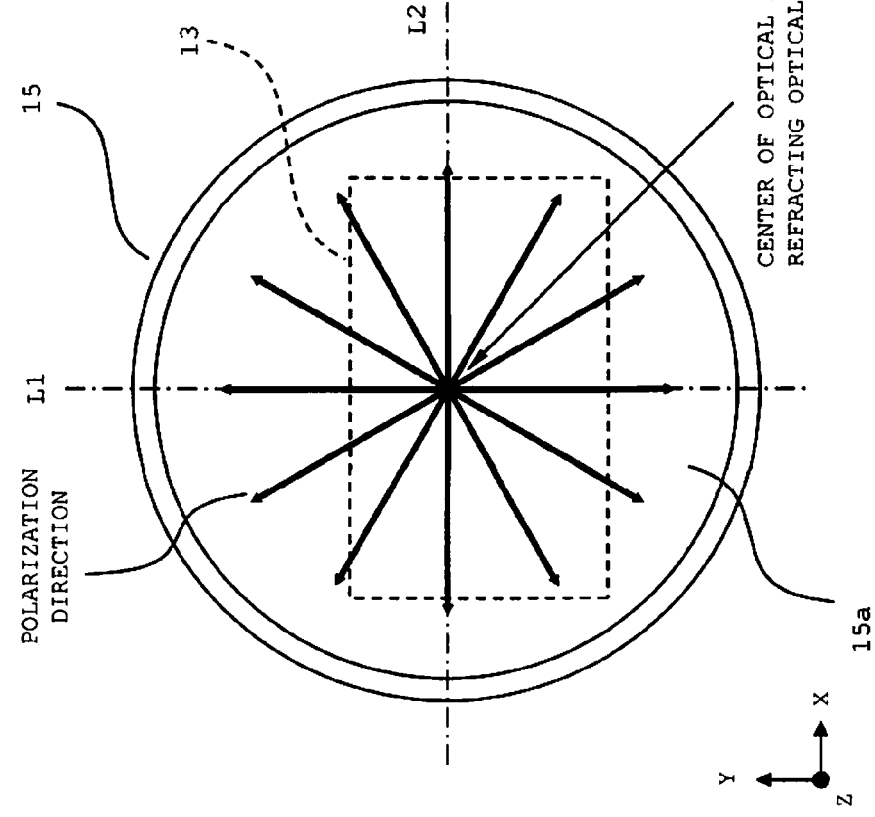

FIG. 2B is a diagram showing an arrangement example of the polarization converting element 14. The polarization converting element 14 in this arrangement example has a plane of a regular dodecagonal shape with a predetermined thickness. Circumferentially and equally divided twelve areas on the plane each has a function substantially equivalent to the function of a half wavelength plate. Whereas the directions (shown by the arrows in FIG. 2B) of anisotropic axes are the same in each of the twelve areas, the direction of anisotropic axes are different from each other among the twelve areas. In this embodiment, the direction of an anisotropic axis in each of the twelve areas is defined in such a manner that upon incidence of linearly polarized light whose polarization direction is aligned in parallel to Y-axis direction in FIG. 2B, the polarization direction is converted into a direction substantially radially extending from the center of the polarization converting element 14.

In this embodiment, since the directions of anisotropic axes are the same in each of the twelve areas, light transmitted through the same area has identical polarization directions. The direction of an anisotropic axis in each of the twelve areas is defined in such a manner that the polarization direction after conversion is aligned in parallel to a parting line for equally dividing the area into two in the circumferential direction of the polarization converting element 14. Accordingly, strictly speaking, the polarization direction after conversion may be displaced from a radially outwardly direction (hereinafter, called as a "radial direction") from the center of the polarization converting element 14, as the converting position is circumferentially away from the parting line.

In this embodiment, however, since the angular width of each area in the circumferential direction of the polarization converting element 14 is small (i.e. 360°/12=30°), a displacement angle of the polarization direction after conversion with respect to the radial direction is not significantly large. The displacement angle is about 15° at most even at a circumferentially farthest position from the parting line. In this way, even if the polarization direction after conversion is displaced from the radial direction, the displacement angle is not so large that the polarization direction after conversion can be conceived to be substantially aligned with the radial direction. By increasing the number of areas obtained by circumferentially and equally dividing the plane of the polarization converting element 14, the displacement angle of the polarization direction in each of the areas can be further reduced.

The polarization converting element 14 having the above arrangement is arranged at such a position that the center thereof is in agreement with the center of the optical axis of the refracting optical system 15, and that the anisotropic axes L1 and L2 in FIG. 2B are respectively in agreement with the anisotropic axes L1 and L2 in FIG. 2A. Thereby, the polarization direction of R light, G light, B light (i.e. modulated light) in incidence onto the refracting optical system 15 radially extends from the center of the optical axis of the refracting optical system 15 by the polarization converting element 14.

Each of the areas formed on the plane of the polarization converting element 14 may have e.g. a photonic crystal structure.

FIG. 3 is a diagram schematically showing a photonic crystal structure 141. As shown in FIG. 3, the photonic crystal structure 141 is obtained by laminating a first layer 141b and a second layer 141c in the order in multiple layers on a substrate 141a formed with parallel grooves each having a triangular shape in cross section. The first layer 141b and the second layer 141c are dielectric layers having refractive indexes different from each other. The function of a half wavelength plate is imparted to the photonic crystal structure 141 by adjusting the pitch and the depth of the grooves, and the refractive indexes and the thicknesses of the first layer 141b and the second layer 141c. The photonic crystal structure of the above type is manufactured by Photonic Lattice, Inc.

As shown in FIG. 3, in the case where linearly polarized light is incident onto the photonic crystal structure 141 in a state that the polarization direction thereof is tilted with respect to the anisotropic axis by the angle θ in a plane perpendicularly intersecting with the light incident direction, the polarization direction of light transmitted through the photonic crystal structure 141 is aligned in a direction symmetrical with respect to the anisotropic axis as a symmetrical axis. As a result, the polarization direction of light transmitted through the photonic crystal structure 141 is tilted with respect to the anisotropic axis by the angle −θ.

Figure 4B:
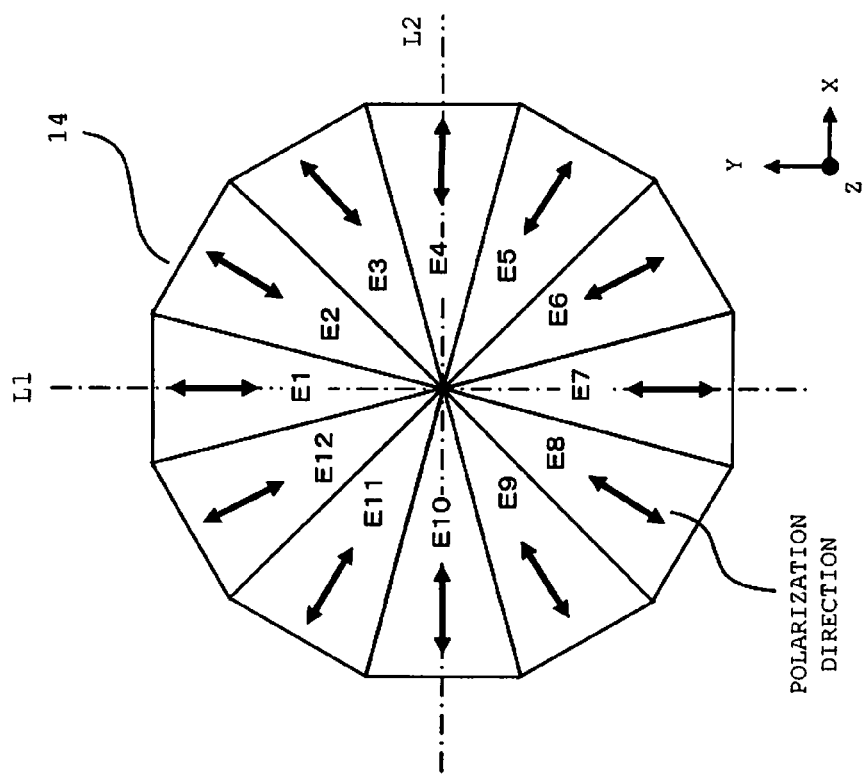
FIGS. 4A and 4B are diagrams respectively showing an arrangement example of the polarization converting element, and a polarization direction of light after conversion of the polarization direction in the first embodiment.
Figure 4A:
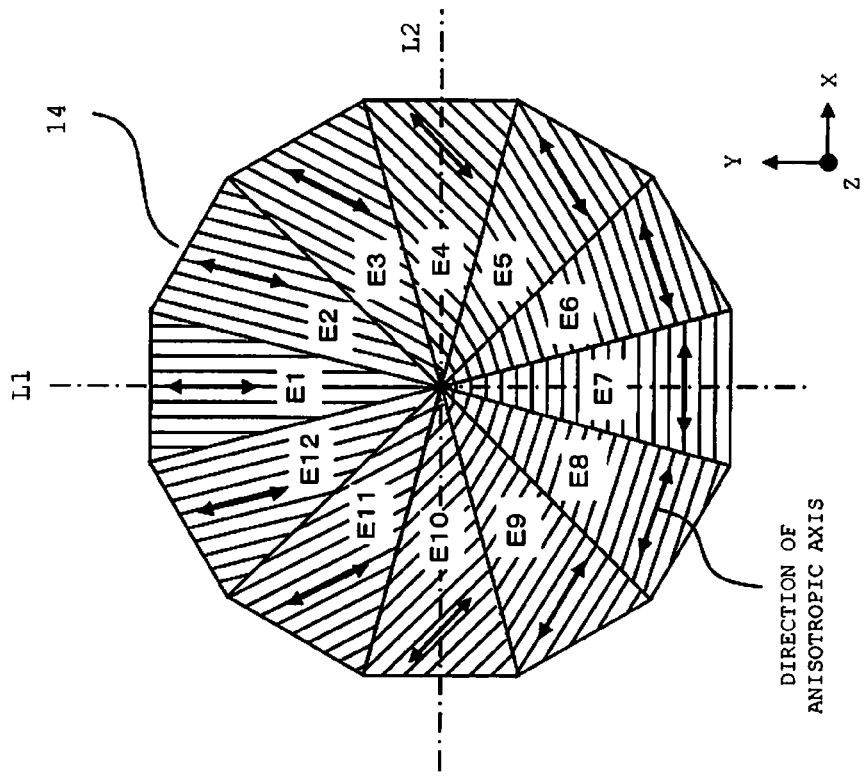

FIG. 4A is a diagram schematically showing an arrangement of the polarization converting element 14 in the case where the photonic crystal structure is formed in each of the areas shown in FIG. 2B. Anisotropic axes having directions (shown by the arrows in FIG. 4) satisfying that the polarization direction after conversion is aligned with the radial direction as described above are defined in areas E1 through E12. In this arrangement, in the case where linearly polarized light whose polarization direction is aligned in parallel to Y-axis direction in FIG. 4A is transmitted through the polarization converting element 14, the polarization directions of light transmitted through the areas E1 through E12 are aligned with the radial directions (shown by the arrows in FIG. 4B), respectively.

The photonic crystal structure has a wavelength selectivity. Accordingly, in the case where the polarization converting element 14 has a photonic crystal structure, it is necessary to arrange a polarization converting element individually with respect to R light, G light, and B light. In other words, the polarization converting element 14 shown in FIG. 1A is a unit, wherein three polarization converting elements for R light, G light, and B light are placed one over the other in the propagating direction of light of the respective colors.

As described above, in this embodiment, the polarization direction of R light, G light, B light (i.e. modulated light) in incidence onto the refracting optical system 15 radially extends from the center of the optical axis of the refracting optical system 15 by providing the polarization converting element 14 in front of the refracting optical system 15. Thereby, the transmittance of R light, G light, and B light in transmitting through the refracting optical system 15 is increased.

Figure 5:
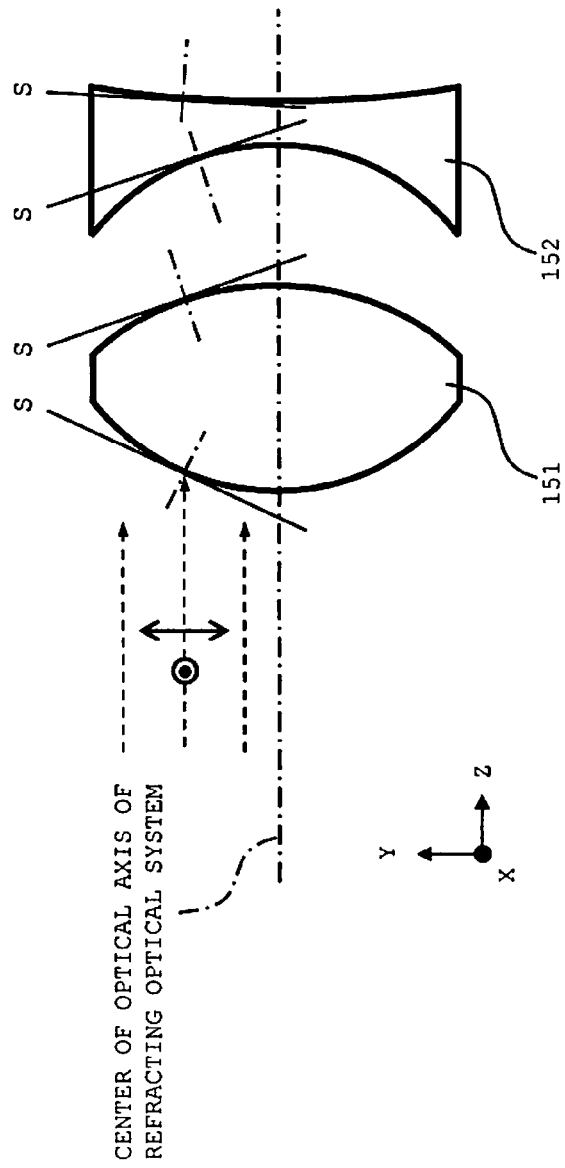
FIG. 5 is a diagram for describing an effect of the first embodiment.

As shown in FIG. 5, light rays of the respective colors are incident onto each of tangential planes S of a lens 151, 152 constituting the refracting optical system 15 with different angles from each other. Generally, a reflectance and a transmittance of light to be incident from a medium 1 having a refractive index n1 to a medium 2 having refractive index n2 are expressed by the following formula.

1. Reflectance:

$E \parallel$ incident plane (P-polarized light)

$$R_P = \left[ \frac{n^2\cos\phi_1 - \sqrt{(n^2 - \sin^2\phi_1)}}{n^2\cos\phi_1 + \sqrt{(n^2 - \sin^2\phi_1)}} \right]^2$$

$E \perp$ incident plane (S-polarized light)

$$R_s = \left[ \frac{\cos\phi_1 - \sqrt{(n^2 - \sin^2\phi_1)}}{\cos\phi_1 + \sqrt{(n^2 - \sin^2\phi_1)}} \right]^2$$

where $n = n_2/n_1$

2. Transmittance:

$E \parallel$ incident plane (P-polarized light) (1)

$$T_P = \frac{4n^2\cos\phi_1 \sqrt{(n^2 - \sin^2\phi_1)}}{\left( n^2\cos\phi_1 + \sqrt{(n^2 - \sin^2\phi_1)} \right)^2}$$

$E \perp$ incident plane (S-polarized light)

$$T_S = \frac{4\cos\phi_1 \sqrt{(n^2 - \sin^2\phi_1)}}{\left( \cos\phi_1 + \sqrt{(n^2 - \sin^2\phi_1)} \right)^2}$$

where $n = n_2/n_1$

In the above formulas, $\phi_1$ and $\phi_2$ are respectively an incident angle and a refractive angle of light to be incident from the medium 1 to the medium 2; $R_P$ and $R_S$ are respectively reflectances of light in the case where the light is incident onto an incident plane (i.e. a boundary surface between the medium 1 and the medium 2) as P-polarized light and S-polarized light; and $T_P$ and $T_S$ are respectively transmittances of light in the case where the light is incident onto the incident plane (i.e. the boundary surface between the medium 1 and the medium 2) as P-polarized light and S-polarized light.

Since R light, G light, and B light have different wavelength from each other, refractive indexes of R light, G light, and B light with respect to each of the lenses 151 and 152 in the refracting optical system 15 are different from each other. Accordingly, refractive powers of each of the lenses 151 and 152 with respect to R light, G light, and B light are different from each other. As a result, light rays of the respective colors are propagated on different optical paths from each other in the refracting optical system 15. Therefore, the incident angles of the light rays of the respective colors with respect to each of the lenses 151 and 152 are different from each other, and accordingly, the transmittances of the light rays of the respective colors are different from each other depending on the color. Further, since the difference in the refractive index affects the parameter (n) in the above formula (1), the transmittances of the light rays of the respective colors with respect to each of the lenses 151 and 152 are different from each other.

Figure 6:
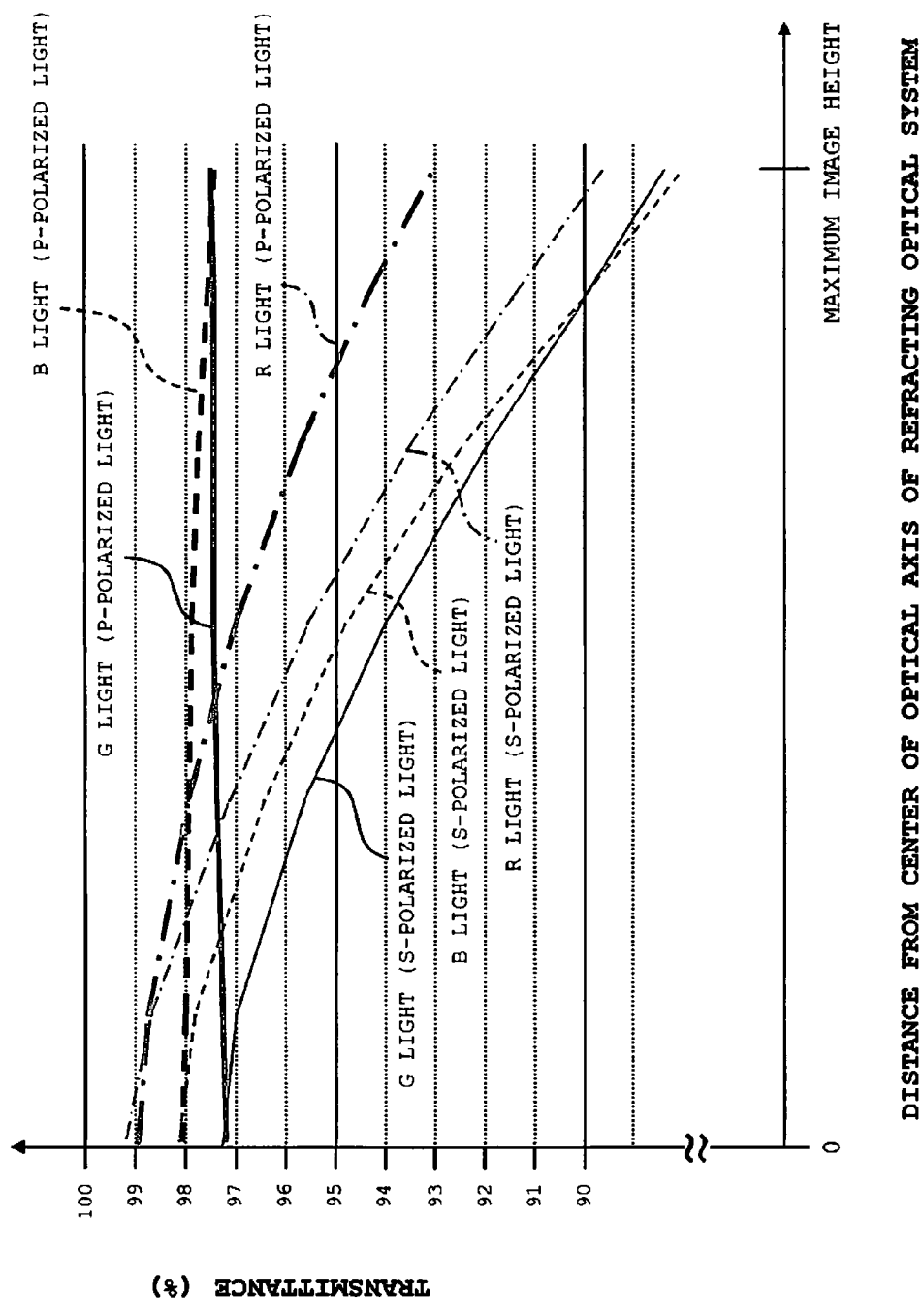
FIG. 6 is a diagram for describing an effect of the first embodiment.

FIG. 6 is a simulation diagram showing a relation between a distance from the center of the optical axis of the refracting optical system 15, and a transmittance of light of the respective colors. The simulation diagram shown in FIG. 5 is obtained by calculating the sum of transmittances to be obtained in the case where light of the respective colors is transmitted through all the lenses in the refracting optical system 15, based on an optical design parameter of each of the lenses.

As shown in FIG. 6, the transmittance to be obtained in the case where light of the respective colors is incident onto the refracting optical system 15 as P-polarized light is remarkably increased, as compared with the case that light of the respective colors is incident onto the refracting optical system 15 as S-polarized light. In the case where the polarization converting element 14 is not provided in the optical system shown in FIG. 1A, light of the respective colors is incident onto the refracting optical system 15 in a state of linearly polarized light whose polarization direction is aligned in parallel to Y-axis direction. Accordingly, the polarization state of light of the respective colors in incidence onto the refracting optical system 15 is coincident with a polarization state of P-polarized light, a polarization state of S-polarized light, or a polarization state between the polarization states of P-polarized light and S-polarized light depending on a change in the position of the incident-side lens in the circumferential direction. As a result, the sum of transmittances to be obtained in the case where light of the respective colors is transmitted through all the lenses in the refracting optical system 15 is changed depending on the position of the incident-side lens in the circumferential direction. Accordingly, in the case where the polarization converting element 14 is not provided, the intensity distribution of light transmitted through the refracting optical system 15 may be made non-uniform resulting from a non-uniformity in the sum of the transmittances.

On the other hand, in the case where the polarization converting element 14 is provided, as described above, R light, G light, B light is incident onto the refracting optical system 15 in a substantially P-polarized state at any position of the incident-side lens in the circumferential direction. Accordingly, the sum of the transmittances to be obtained in the case where light of the respective colors is transmitted through all the lenses in the refracting optical system 15 is not changed depending on the position of the incident-side lens in the circumferential direction, and can be increased to a value close to a transmittance corresponding to incidence of P-polarized light.

In the above embodiment, arranging the polarization converting element 14 in the aforementioned manner enables to make the intensity distribution of light transmitted through the refracting optical system 15 substantially uniform in the circumferential direction of the polarization converting element 14, and enhance light use efficiency of R light, G light, B light (i.e. modulated light). Thereby, an image having a uniform brightness can be projected onto the projection plane.

FIG. 7A is a diagram schematically showing an arrangement of a polarization converting element 14', wherein a photonic crystal structure is sequentially formed. More specifically, a light incident area is divided into a number of smallest areas, and as shown in FIG. 7B, anisotropic axes having directions (shown by the arrows in FIG. 7B) satisfying that the polarization direction after conversion is aligned with the radial direction are defined in each of the smallest areas ΔE obtained by division. In this arrangement, in the case where linearly polarized light whose polarization direction is aligned in parallel to Y-axis direction FIG. 7B is transmitted through the polarization converting element 14', no discontinuous boundary portion is formed in the polarization direction of light transmitted through the polarization converting element 14'. Thus, the polarization direction of light is continuously converted into a radial direction at any position within the plane of the polarization converting element 14' by using the polarization converting element 14' shown in FIG. 7A.

Second Embodiment

Figure 8:
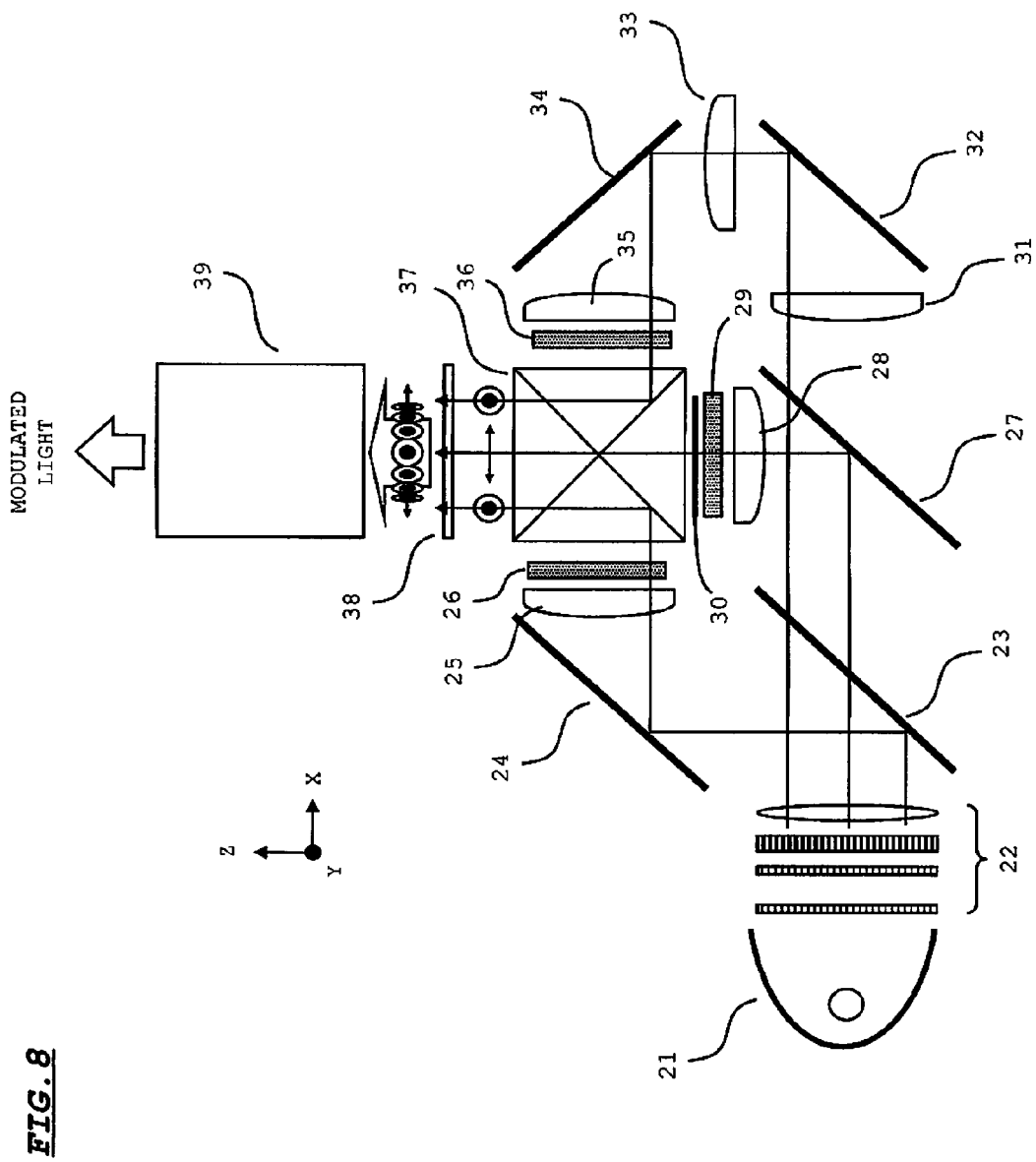
FIG. 8 is a diagram showing an arrangement of a projector (i.e. an optical system) in accordance with a second embodiment of the invention.

FIG. 8 is a diagram showing an arrangement of a projector (i.e. an optical system) in accordance with the second embodiment of the invention. This embodiment is directed to a three-panel projector to which the invention is applied.

A light source 21 is constituted of a lamp and a reflector, and emits substantially parallel light to an illuminating optical system 22. The illuminating optical system 22 includes a fly-eye lens, a PBS array, and a condenser lens, and is operable to make a light amount distribution of light of the respective colors in incidence onto an imager (i.e. a liquid crystal panel) 26, 29, 36 substantially uniform, and align the polarization direction of light directed to a dichroic mirror 23 in Y-axis direction in FIG. 8.

The dichroic mirror 23 reflects only B light out of the light incident from the illuminating optical system 22, and transmits R light and G light. A mirror 24 reflects the B light reflected on the dichroic mirror 23 in a direction toward a lens 25. The B light is incident onto the imager 26 via the lens 25 and a polarizer (not shown) and a lens 28. The imager 26 is driven in accordance with an image signal for blue color to modulate the B light depending on a driving condition of the imager 26. A polarizer (not shown) is arranged on the output side of the imager 26.

A dichroic mirror 27 reflects only the G light out of the R light and the G light transmitted through the dichroic mirror 23. The G light is incident onto the imager 29 via a polarizer (not shown). The imager 29 is driven in accordance with an image signal for green color to modulate the G light depending on a driving condition of the imager 29. A polarizer (not shown) is arranged on the output side of the imager 29. A half wavelength plate 30 rotates the polarization direction of G light by 90 degrees. Thereby, the polarization direction of G light is aligned with X-axis direction in FIG. 8.

The R light transmitted through the dichroic mirror 27 is incident onto the imager 36 via mirrors 32 and 34, and lenses 31, 33, and 35. The imager 36 is driven in accordance with an image signal for red color to modulate the R light depending on a driving condition of the imager 36. A polarizer (not shown) is arranged on the incident side and the output side of the imager 36.

A dichroic prism 37 reflects the B light and the R light, and transmits the G light out of the B light, the G light, and the R light that have been respectively modulated by the imagers 26, 29, and 36, whereby the B light, G light, and the R light are combined. The B light and the R light are incident onto a reflection surface of the dichroic prism 37 as S-polarized light, and the G light is incident onto a reflection surface of the dichroic prism 37 as P-polarized light.

A polarization converting unit 38 converts the polarization direction of R light, G light, B light (i.e. modulated light) in such a manner that the polarization direction of the modulated light radially extends from the center of the optical axis of a refracting optical system 39. Multiple lenses are arranged in the optical axis direction of the refracting optical system 39. R light, G light, B light (i.e. modulated light) whose polarization direction has been converted by the polarization converting unit 38 is enlarged and projected onto a projection screen via the refracting optical system 39.

Figure 9:
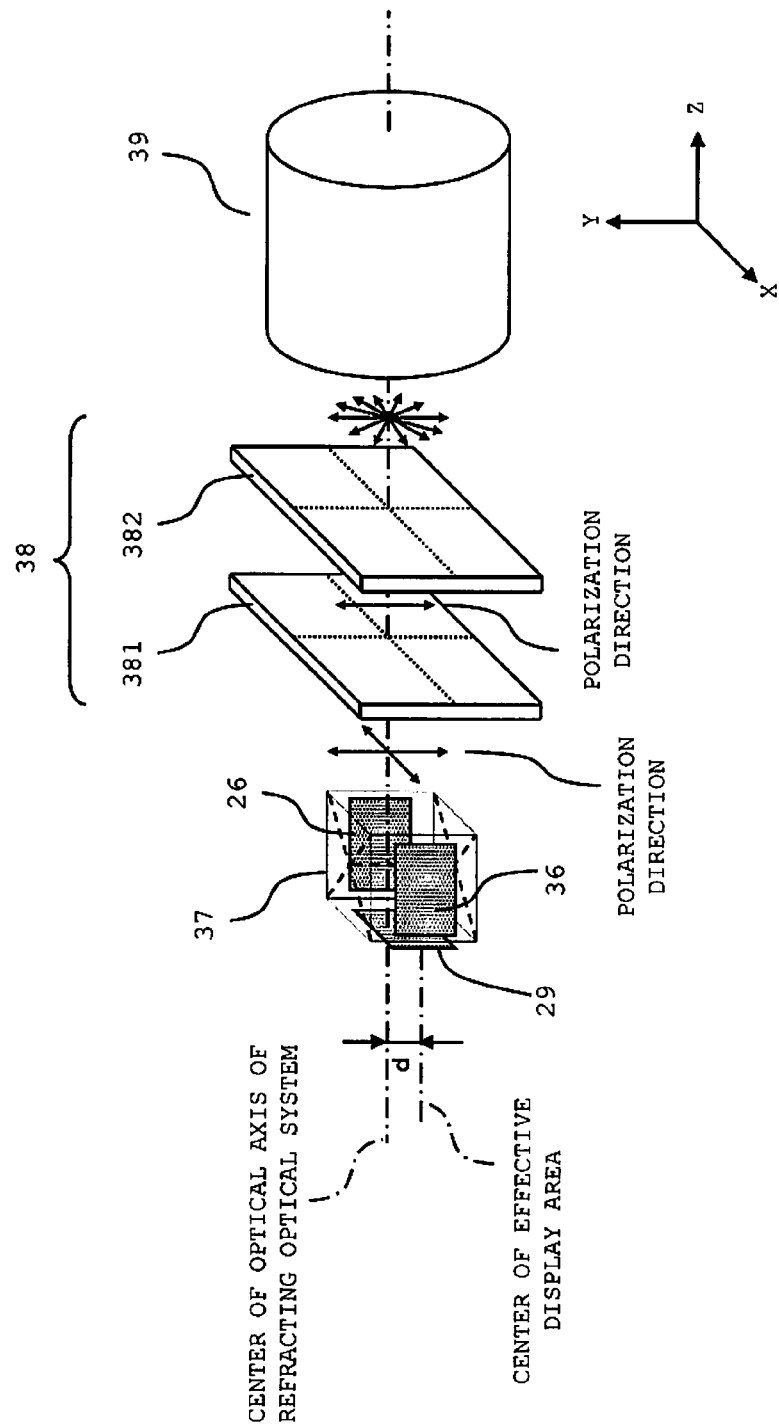
FIG. 9 is a diagram showing a part of the optical system in the second embodiment in detail.

FIG. 9 is a diagram showing an arrangement from the imagers 26, 29, 36 to the refracting optical system 39 in detail. As shown in FIG. 9, the imager 26, 29, 36 is arranged at such a position that the center of an effective display area thereof is displaced from the center of the optical axis of the refracting optical system 39 in Y-axis direction by the distance (d). In this arrangement, R light, G light, B light (i.e. modulated light) modulated by the imager 26, 29, 36, and combined by the dichroic prism 37 is incident onto the refracting optical system 39 at a position displaced from the center of the optical axis of the refracting optical system 39 by a distance corresponding to the displacement.

In this embodiment, the polarization converting unit 38 is constituted of a half wavelength plate 381 having a wavelength selectivity and a polarization converting element 382. In this embodiment, the half wavelength plate 381 rotates only the polarization direction of G light by 90 degrees. Thereby, the polarization direction of G light is aligned in parallel to Y-axis direction in FIG. 9, and aligned with the polarization direction of B light, R light. Accordingly, similarly to the first embodiment, R light, G light, B light (i.e. modulated light) is incident onto the polarization converting element 382 in a state of linearly polarized light whose polarization direction is aligned in parallel to Y-axis. The polarization converting element 382 is configured and arranged in the same manner as in the first embodiment. Accordingly, similarly to the first embodiment, R light, G light, B light (i.e. modulated light) transmitted through the polarization converting element 382 is allowed to be incident onto the refracting optical system 39 in a state that the polarization direction of the modulated light radially extends from the center of the optical axis of the refracting optical system 39.

As described above, similarly to the first embodiment, light of the respective colors is allowed to be incident onto the refracting optical system 39 in a state that the polarization direction of light radially extends from the center of the optical axis of the refracting optical system 39. Accordingly, similarly to the first embodiment, the intensity distribution of light transmitted through the refracting optical system 39 can be made substantially uniform, and light use efficiency of R light, G light, B light (i.e. modulated light) can be enhanced. Thereby, an image having a uniform brightness can be projected onto the projection screen.

Third Embodiment

Figure 10:
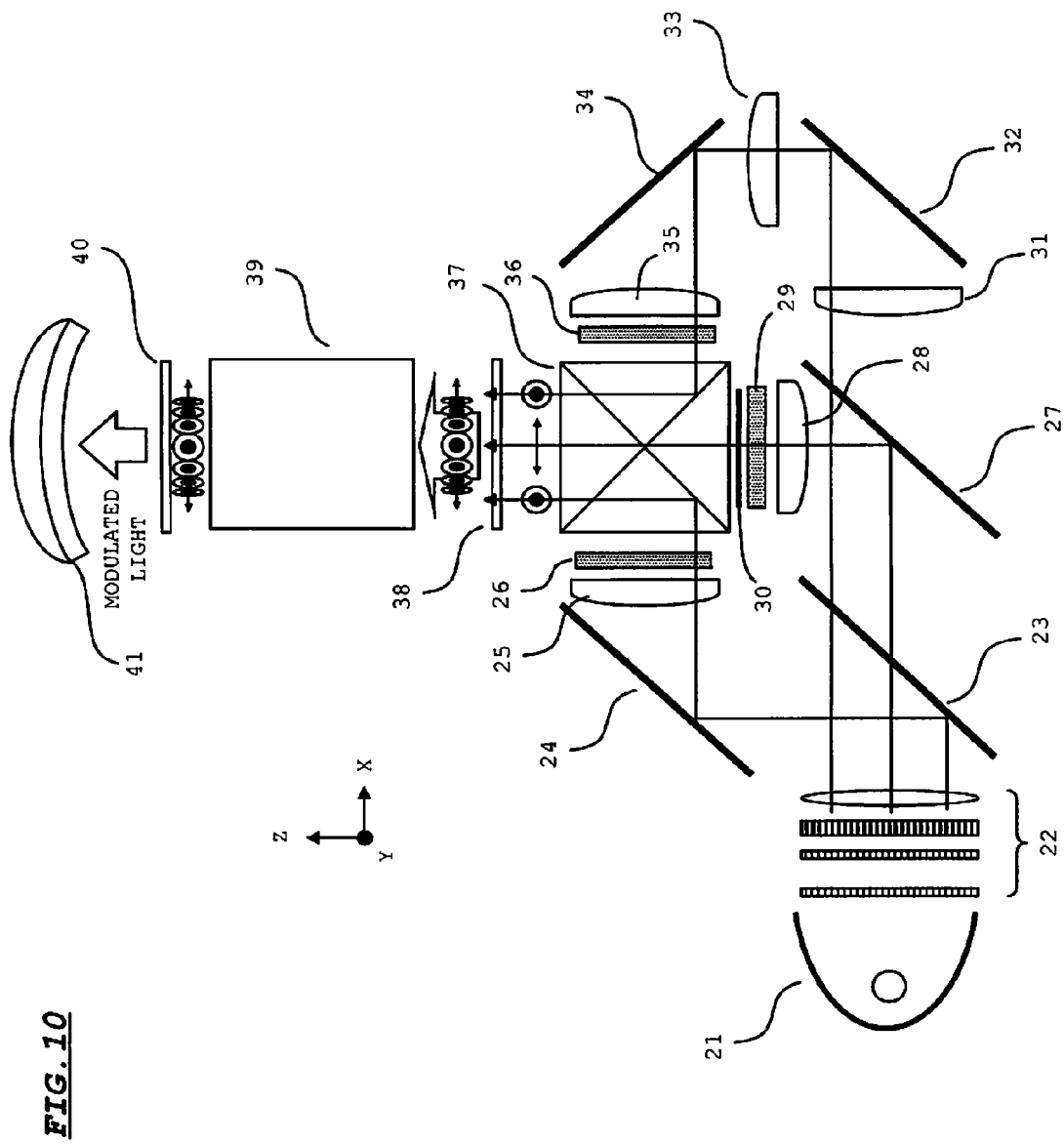
FIG. 10 is a diagram showing an arrangement of a projector (i.e. an optical system) in accordance with a third embodiment of the invention.

FIG. 10 is a diagram showing an arrangement of a projector (i.e. an optical system) in accordance with the third embodiment of the invention. This embodiment is directed to an oblique projecting projector to which the invention is applied. The projector is adapted to enlarge and project modulated light emitted from a refracting optical system onto a projection screen by a reflecting optical system.

Referring to FIG. 10, an arrangement from a light source 21 to a refracting optical system 39 is substantially the same as the corresponding arrangement in the second embodiment. In this embodiment, a polarization converting element 40, and a reflection mirror 41 constituting a reflecting optical system are arranged at a position posterior to the refracting optical system 39.

The polarization converting element 40 converts the polarization direction of R light, G light, B light (i.e. modulated light) in such a manner that the polarization direction of R light, G light, B light (i.e. modulated light) is coaxially aligned with the center of the optical axis of the refracting optical system 39. The reflection mirror 41 is constituted of an aspherical mirror or a mirror having a free curved surface, and projects projected light incident from the refracting optical system 39 onto the projection screen as a wide-angle image. In this embodiment, the refracting optical system 39 and the reflection mirror 41 constitute a projecting optical system.

Figure 11:
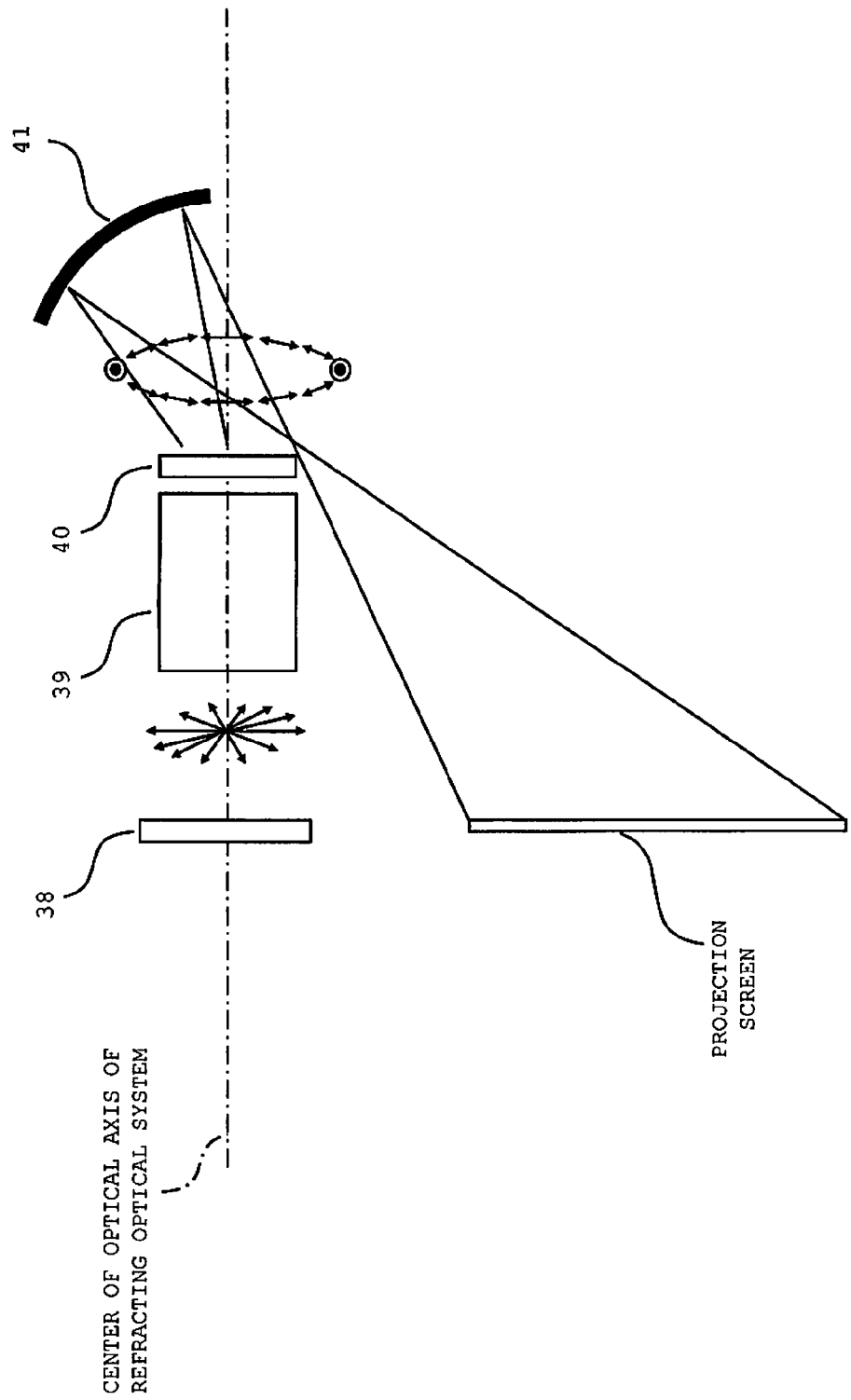
FIG. 11 is a diagram schematically showing a part of the optical system, and a light projecting state in the third embodiment.

FIG. 11 is a schematic side view of an arrangement from a polarization converting unit 38 to the reflection mirror 41. The reflection mirror 41 has a shape obtained by cutting away an area other than an effective incident area for allowing incidence of R light, G light, B light (i.e. modulated light) from a concave mirror of a perfect shape with the contour of a reflection surface thereof being formed into a closed circle. The reflection mirror 41 is arranged at such a position that the center of the optical axis of the concave mirror of a perfect shape is in agreement with the center of the optical axis of the refracting optical system 39. As shown in FIG. 11, R light, G light, B light (i.e. modulated light) transmitted through the refracting optical system 39 is incident onto the reflection mirror 41 via the polarization converting element 40, and the incident light is enlarged and projected onto the projection screen by the reflection mirror 41. In the incidence, R light, G light, B light (i.e. modulated light) is incident onto the reflection mirror 41 in such a manner that the polarization direction of the modulated light is coaxially aligned with the center of the optical axis of the refracting optical system 39 by the function of the polarization converting element 40.

Figure 12:
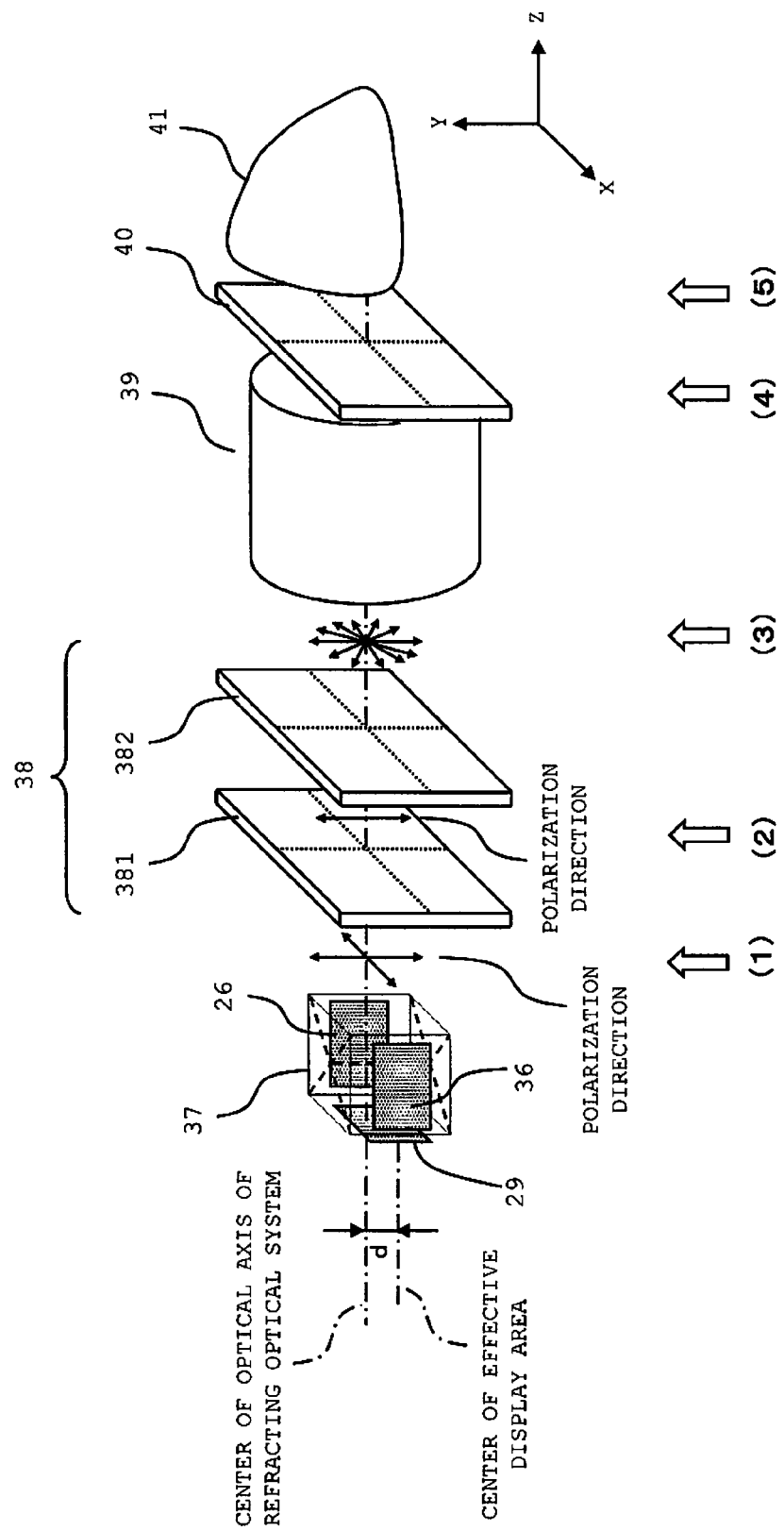
FIG. 12 is a diagram showing a part of the optical system in the third embodiment in detail.

FIG. 12 is a diagram showing an arrangement from imagers 26, 29, and 36 to the reflection mirror 41 in detail. As described in the second embodiment, the imager 26, 29, 36 is arranged at such a position that the center of the effective display area thereof is displaced from the center of the optical axis of the refracting optical system 39 in Y-axis direction by the distance (d). Accordingly, R light, G light, B light (i.e. modulated light) modulated by the imager 26, 29, 36, and combined by a dichroic prism 37 is incident onto the refracting optical system 39 at a position displaced from the center of the optical axis of the refracting optical system 39 by a distance corresponding to the displacement. Thereafter, R light, G light, B light (i.e. modulated light) is propagated in an obliquely upward direction through the refracting optical system 39 for incidence onto the reflection mirror 41 via the polarization converting element 40.

In the following, polarization states of R light, G light, B light (i.e. modulated light) at the locations (1) through (5) in FIG. 12 are described referring to FIGS. 13A through 16. FIGS. 13A through 16 conceptually illustrate polarization states of light of the respective colors directed from the dichroic prism 37 toward the reflection mirror 41, viewed from the locations (1) through (5).

In FIGS. 13A through 16, nine points (a) through (i) are defined in the effective display area (indicated as a modulated light area in FIGS. 13A through 16) of the imager 26, 29, 36, as reference points, and polarization directions of light emitted from the respective reference points are indicated by the solid arrows. In an actual practice, light rays emitted from the respective positions on the imager 26, 29, and 36 has a certain emission angle. Accordingly, light rays emitted from the reference points (a) through (i) are partially superimposed one over the other. As a result, actual light rays emitted from the reference points (a) through (i) may have polarization directions slightly displaced from the states shown in FIGS. 13A through 16, or may have different polarization components. However, many of the light rays emitted from the reference points (a) through (i) have idealistic polarization states shown in FIGS. 13A through 16. Accordingly, the polarization states at the locations (1) through (5) in FIG. 12 are described based on the idealistic polarization states.

Figure 13B:
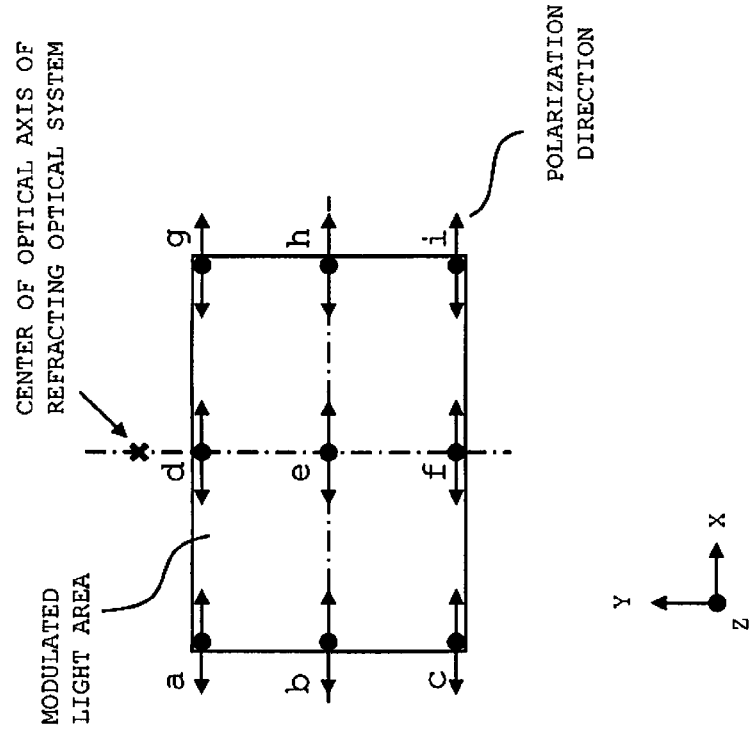
FIGS. 13A and 13B are diagrams schematically showing polarization states at the location (1) in FIG. 12, respectively.
Figure 13A:
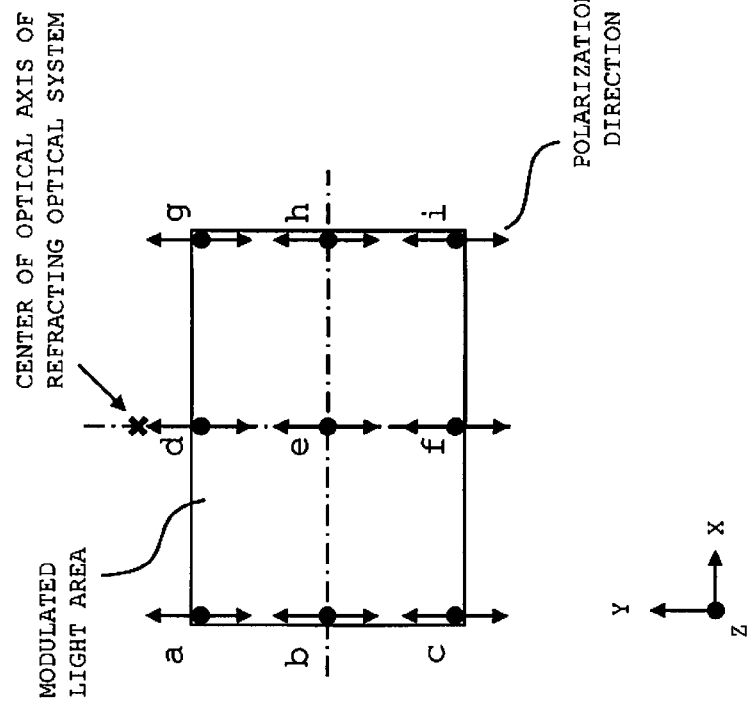

FIGS. 13A and 13B are diagrams showing polarization states at the location (1) (i.e. the position between the dichroic prism 37 and a half wavelength plate 381) in FIG. 12. FIG. 13A shows a polarization state of R light, B light, and FIG. 13B shows a polarization state of G light. As described above, R light, G light is linearly polarized light whose polarization direction is aligned in parallel to Y-axis, and G light is linearly polarized light whose polarization direction perpendicularly intersects with Y-axis.

Figure 14B:
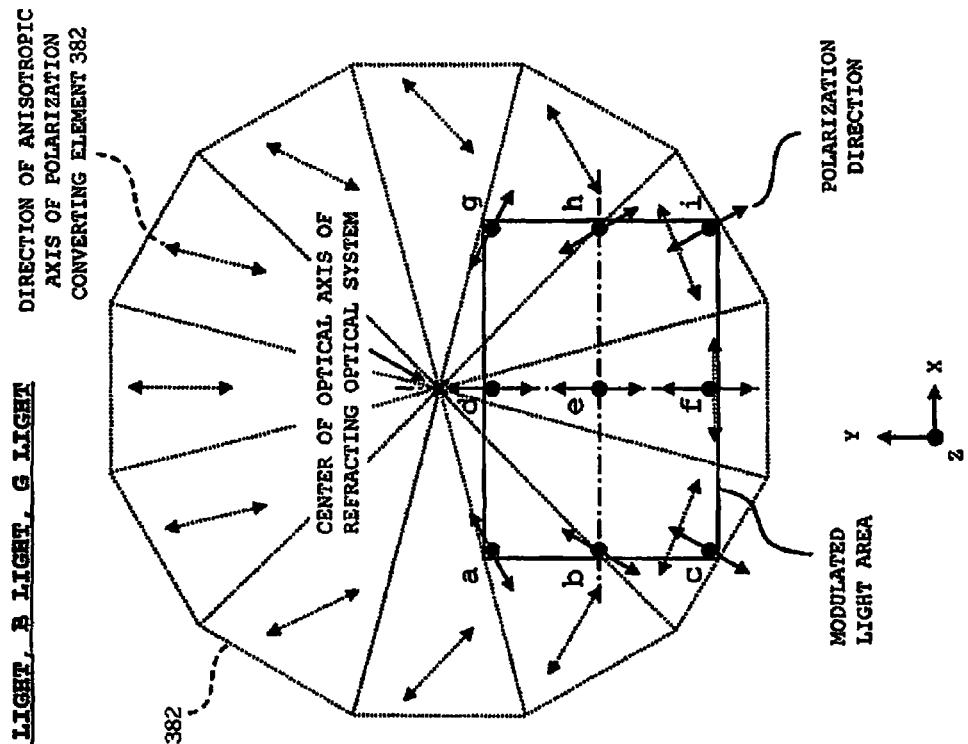
FIGS. 14A and 14B are diagrams schematically showing polarization states at the locations (2) and (3) in FIG. 12, respectively.
Figure 14A:
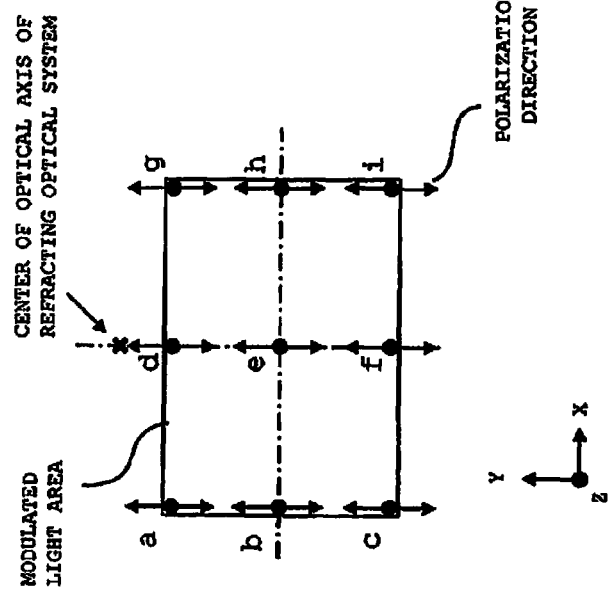

FIG. 14A is a diagram showing a polarization state at the location (2) (i.e. the position between the half wavelength plate 381 and a polarization converting element 382) in FIG. 12. As described above, since the polarization direction of G light is rotated by 90 degrees by the half wavelength plate 318, all of R light, G light, and B light is linearly polarized light whose polarization direction is aligned in parallel to Y-axis.

FIG. 14B is a diagram showing a polarization state at the location (3) (i.e. the position between the polarization converting element 382 and the refracting optical system 39) in FIG. 12. The polarization direction of R light, G light, B light (i.e. modulated light) is converted into a direction radially extending from the center of the optical axis of the refracting optical system 39 by the aforementioned polarization converting function by the polarization converting element 382. Accordingly, at the location (3), R light, G light, B light is incident onto the refracting optical system 39 as linearly polarized light whose polarization direction radially extends from the center of the optical axis of the refracting optical system 39.

In FIG. 14B, directions of anisotropic axes in divided areas on the polarization converting element 382 are indicated by the dotted arrows. In the example of FIG. 14B, the modulated light area is partially overlapped with the five lower areas of the twelve areas, and is not overlapped with the other seven areas. Accordingly, in this arrangement example, the seven areas which are not overlapped with the modulated light area may be omitted.

Figure 15B:
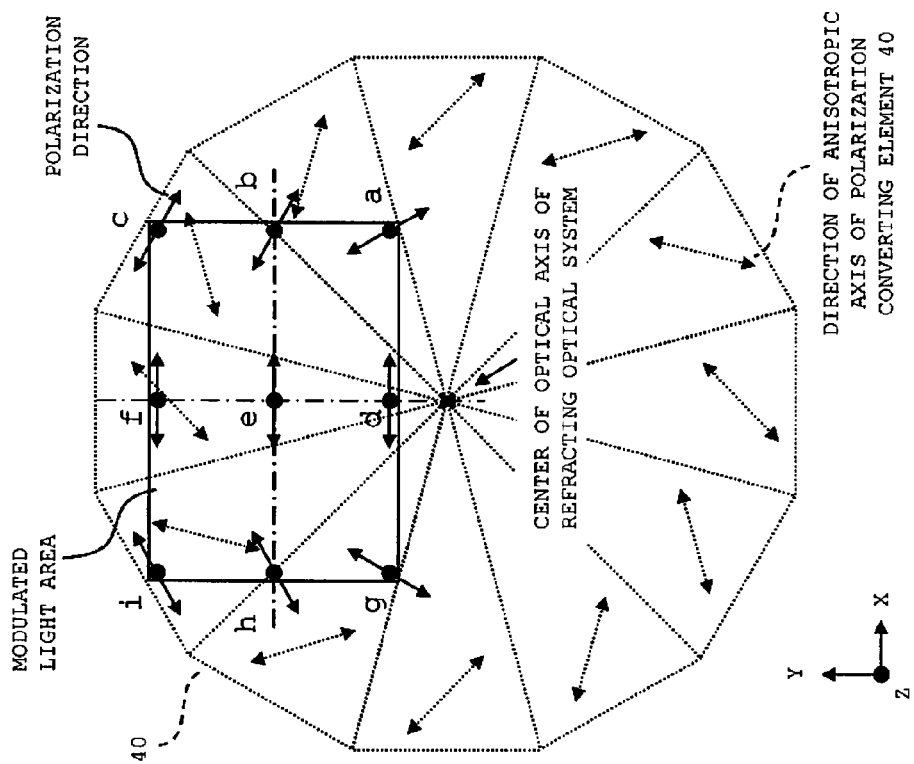
FIGS. 15A and 15B are diagrams schematically showing polarization states at the locations (4) and (5) in FIG. 12, respectively.
Figure 15A:
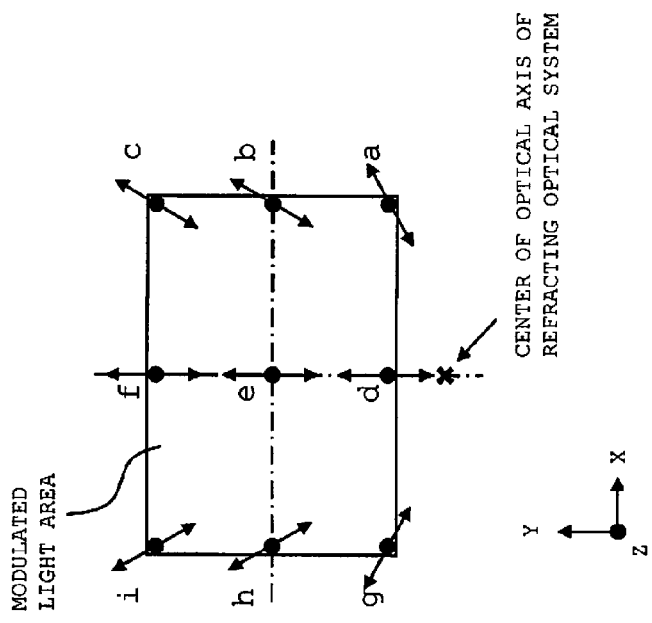

FIG. 15A is a diagram showing a polarization state at the location (4) (i.e. the position between the refracting optical system 39 and the polarization converting element 40) in FIG. 12. The position of any light ray within the modulated light area before transmitting through the refracting optical system 39 is shifted to an inversely folded position with respect to the center of the optical axis of the refracting optical system 39 at a predetermined ratio by transmitting through the refracting optical system 39. Thereby, the polarization state of light rays emitted from the respective positions within the modulated light area at the location (4) is made substantially equal to the polarization state of light rays emitted from the respective corresponding positions before folding. Specifically, the reference points (a) through (i) in the modulated light area are shifted to the respective corresponding positions shown in FIG. 15A by transmitting through the refracting optical system 39, and the polarization directions of light rays emitted from the reference points (a) through (i) are aligned with the polarization directions (see FIG. 14B) of light rays emitted from the reference points (a) through (i) before transmitting of light rays through the refracting optical system 39.

FIG. 15B is a diagram showing a polarization state at the location (5) (i.e. the position between the polarization converting element 40 and the reflection mirror 41) in FIG. 12. In FIG. 15B, directions of anisotropic axes in divided areas on the polarization converting element 40 are indicated by the dotted arrows. The polarization direction of R light, G light, B light (i.e. modulated light) is converted into a direction coaxially aligned with the center of the optical axis of the refracting optical system 39 by the polarization converting function by the polarization converting element 40.

The polarization converting element 40 may have a photonic crystal structure described in the first embodiment. In the modification, the anisotropic axes in the divided areas on the polarization converting element 40 having a photonic crystal structure are defined in such a manner that in incidence of R light, G light, B light (i.e. modulated light) in a polarization state shown in FIG. 15A, the polarization direction of light transmitted through the respective divided areas is converted into a direction coaxially aligned with the center of the optical axis of the refracting optical system 39, as shown in FIG. 15B. Also, since the photonic crystal structure has a wavelength selectivity as described above, in the case where the polarization converting element 40 has a photonic crystal structure, it is necessary to provide a polarization converting element individually with respect to R light, G light, and B light. In other words, the polarization converting element 40 is a unit, wherein three polarization converting elements for R light, G light, and B light are placed one over the other in the propagating direction of light of the respective colors.

Similarly to the arrangement of FIG. 14B, areas out of the twelve areas which are not overlapped with the modulated light area may be omitted. Also, as shown in FIG. 7A, a light incident area of the polarization converting element 40 may be divided into a number of smallest areas, and anisotropic axes having directions satisfying that the polarization direction after conversion is coaxially aligned with the center of the optical axis of the refracting optical system 39 may be defined in each of the smallest areas ΔE obtained by division.

Figure 16:
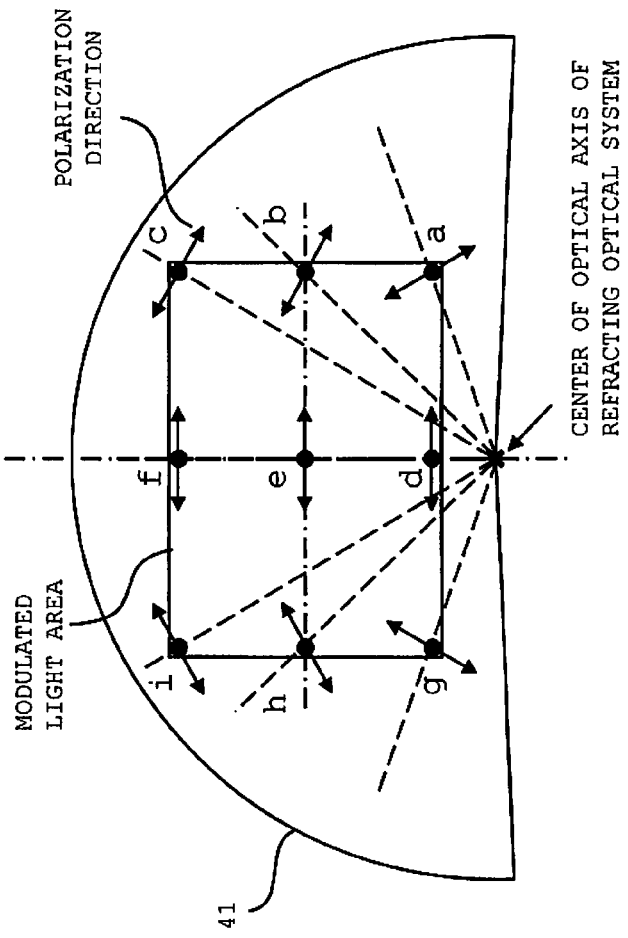
FIG. 16 is a diagram schematically showing a polarization state in incidence onto a reflection mirror in the third embodiment.

FIG. 16 is a diagram showing a polarization state of R light, G light, B light (modulated light) in incidence onto the reflection mirror 41. Similarly to the arrangement shown in FIG. 15B, the polarization direction of light rays emitted from the respective positions within the modulated light area is coaxially aligned with the center of the optical axis of the refracting optical system 39. On the other hand, as described above, the reflection mirror 41 has a shape obtained by cutting away an area other than the effective incident area for allowing incidence of R light, G light, B light (i.e. modulated light) from a concave mirror of a perfect shape with the contour of a reflection surface thereof being formed into a closed circle. The reflection mirror 41 is arranged at such a position that the center of the optical axis of the concave mirror of a perfect shape is in agreement with the center of the optical axis of the refracting optical system 39. Accordingly, as shown in FIG. 16, in the case where a light ray within the modulated light area is incident onto the reflection mirror 41 in a state that the polarization direction thereof is coaxially aligned with the center of the optical axis of the refracting optical system 39, the polarization state of R light, G light, B light (i.e. modulated light) at any incident position on the surface of the reflection mirror 41 is coincident with a state of S-polarized light, or close to the state of S-polarized light with respect to the mirror surface.

As described above, in this embodiment, R light, G light, B light (i.e. modulated light) is allowed to be incident onto the reflection mirror 41 in a state of S-polarized light or a state close to the state of S-polarized light at any incident position. This enables to increase the reflectance of R light, G light, B light (i.e. modulated light) with respect to the reflection mirror 41, as compared with an arrangement that the polarization converting element 40 is not provided.

Figure 17:
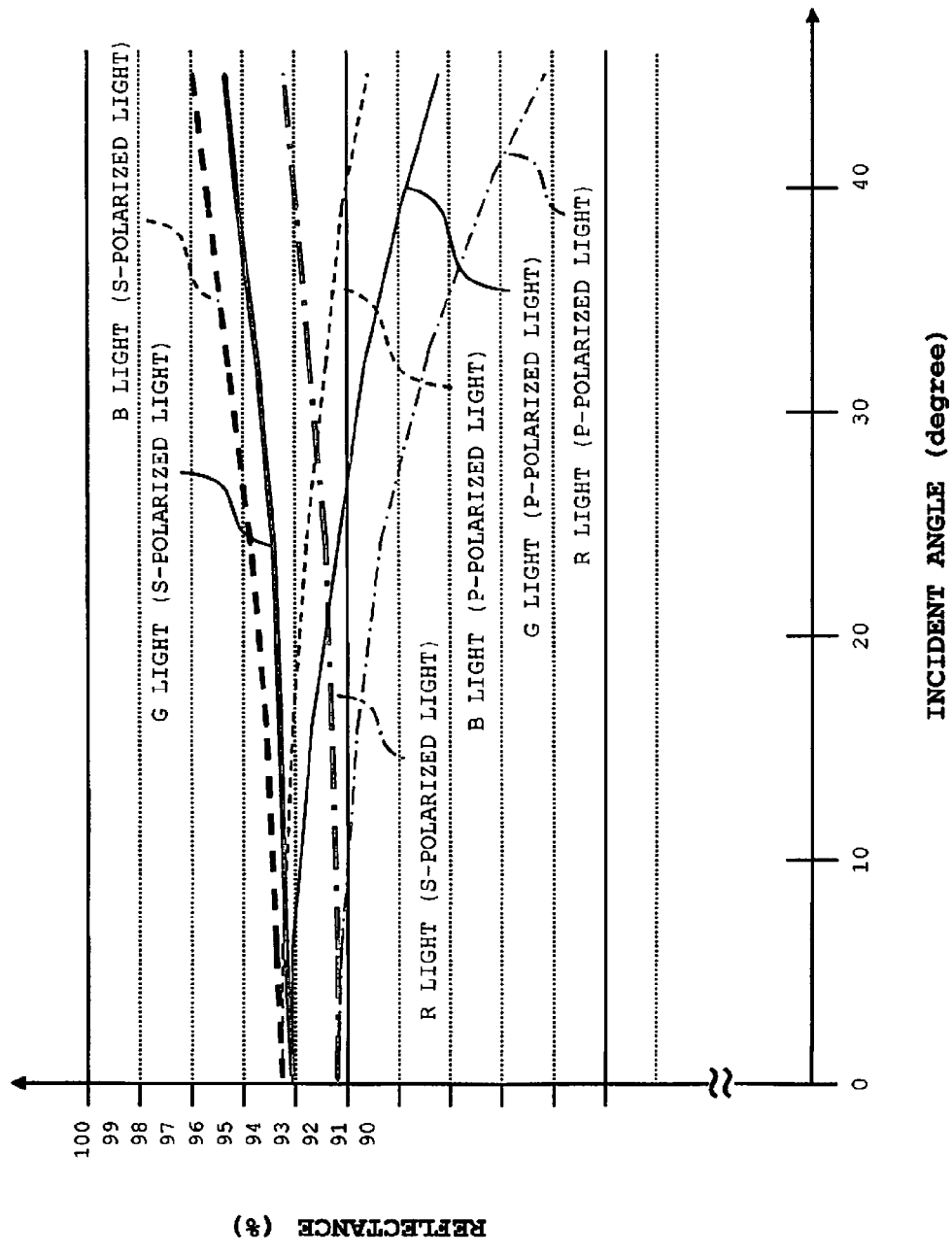
FIG. 17 is a diagram for describing an effect of the third embodiment.

FIG. 17 is a simulation diagram showing a relation between an incident angle and a reflectance of light of the respective colors with respect to the reflection mirror 41. As shown in FIG. 17, the reflectance of light of the respective colors to be incident onto the reflection mirror 41 as S-polarized light is increased, as compared with the reflectance of light of the respective colors to be incident onto the reflection mirror 41 as P-polarized light.

On the other hand, in the case where the polarization converting element 40 is not provided in the optical system shown in FIG. 10, light of the respective colors is incident onto the reflection mirror 41 in a polarization state shown in FIG. 15A. In this case, the polarization state of light of the respective colors in incidence onto the reflection mirror 41 is coincident with a state of P-polarized light, or close to a state of S-polarized light from the state of P-polarized light. As a result, the reflectance of light of the respective colors with respect to the reflection mirror 41 may be lowered, and the reflectance may be varied depending on the incident position. Accordingly, in the case where the polarization converting element 40 is not provided, the intensity distribution of light reflected on the reflection mirror 41 may be made non-uniform, resulting from the non-uniform and lowered reflectance, and the intensity of light itself may be attenuated.

On the other hand, in the case where the polarization converting element 40 is provided, as described above, R light, G light, B light is allowed to be incident onto the reflection mirror 41 in a state of S-polarized light, or a state close to the state of S-polarized light at any incident position. This enables to make the reflectance with respect to the reflection mirror 41 substantially uniform, and increase the reflectance. Accordingly, in this embodiment, providing the polarization converting element 40 in the aforementioned manner enables to make the intensity distribution of light reflected on the reflection mirror 41 substantially uniform, and enhance light use efficiency of R light, G light, B light (i.e. modulated light). Thereby, an image having a uniform brightness can be projected onto the projection screen.

Similarly to the second embodiment, since the polarization converting unit 38 is provided in front of the refracting optical system 39 in this embodiment, a variation in intensity distribution of R light, G light, B light (i.e. modulated light) transmitted through the refracting optical system 39 can be suppressed, and light use efficiency can be enhanced. Also, in this embodiment, providing the polarization converting element 40 in front of the reflection mirror 41 enables to suppress a variation in intensity distribution R light, G light, B light (i.e. modulated light) reflected on the reflection mirror 41 can be suppressed, and enhance light use efficiency. Thereby, the intensity distribution variation can be suppressed, and light use efficiency can be enhanced with respect to the entirety of the projecting optical system.

Fourth Embodiment

In the second embodiment, as shown in FIG. 9, the polarization converting unit 38 is constituted of the half wavelength plate 381 having a wavelength selectivity, and the polarization converting element 382, and after the polarization direction of G light is aligned with the polarization direction of R light, B light by the half wavelength plate 381, the polarization direction of light of the respective colors is converted into a direction radially extending from the center of the optical axis of the refracting optical system 39 by the polarization converting element 382. Alternatively, the polarization converting element 382 may be operable to directly convert the polarization direction of light of the respective colors into a direction radially extending from the center of the optical axis of the refracting optical system 39, without the need of adjusting the polarization direction of G light by the half wavelength plate 381.

Figure 18:
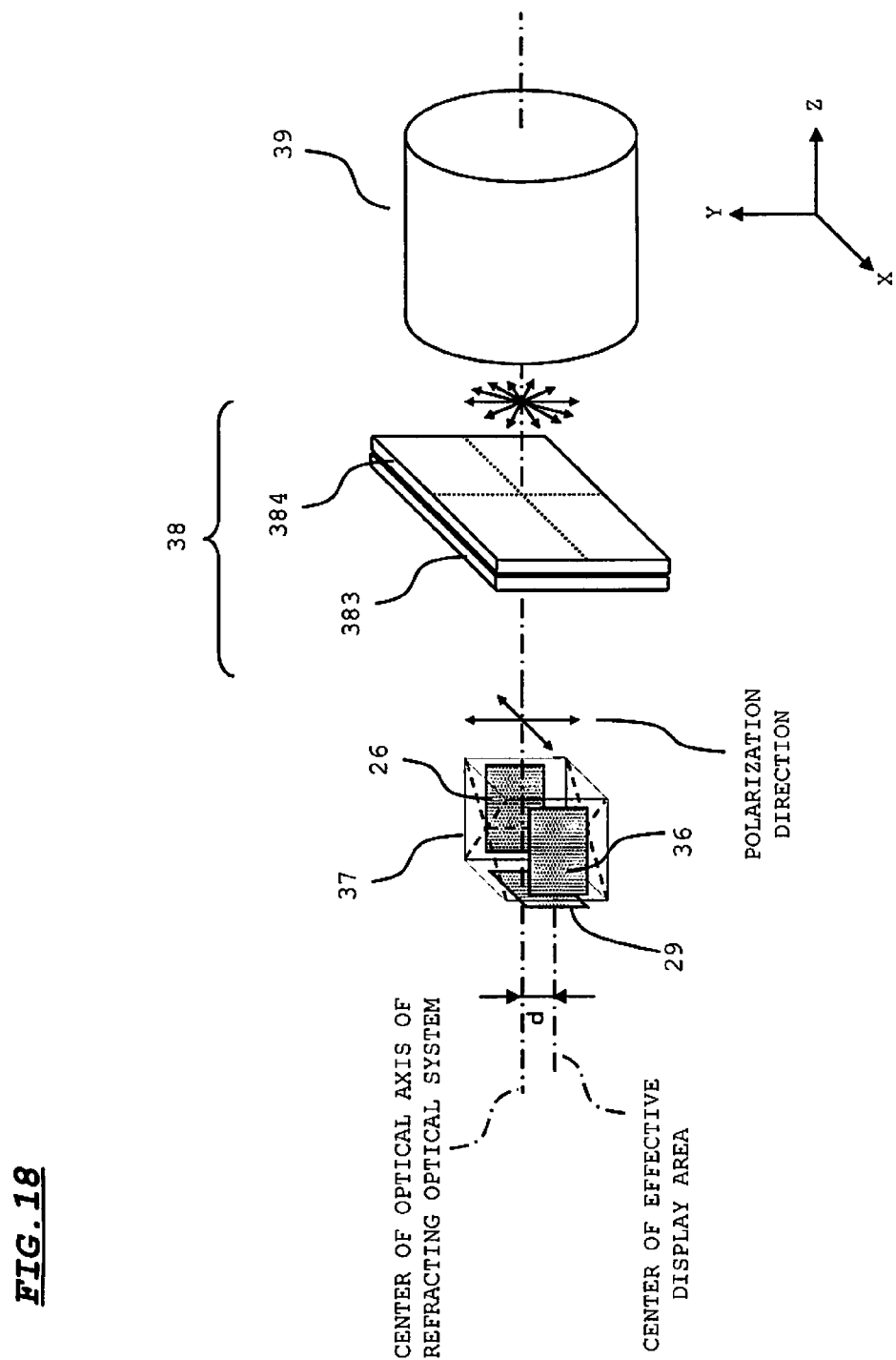
FIG. 18 is a diagram showing a part of an optical system in accordance with a fourth embodiment of the invention in detail.

FIG. 18 is a diagram showing an example of the above arrangement. In this embodiment, a polarization converting unit 38 is constituted of a polarization converting element 383 for G light, and a polarization converting element 384 for R light, B light. The polarization converting element 383 converts the polarization direction of G light, which is incident in a polarization direction aligned with X-axis direction in FIG. 18, into a direction radially extending from the center of the optical axis of a refracting optical system 39. Likewise, the polarization converting element 384 converts the polarization direction of R light, B light, which is incident in a polarization direction aligned with Y-axis direction in FIG. 18, into a direction radially extending from the center of the optical axis of the refracting optical system 39.

In this embodiment, the polarization converting element 383, 384 may be configured in such a manner that the directions of anisotropic axes in divided areas in a circumferential direction of the polarization converting element 383, 384 are adjusted in a similar manner as described in the foregoing description. For instance, the polarization converting element 383, 384 may be configured by forming a photonic crystal structure, wherein the directions of anisotropic axes are different from each other among the areas. In this arrangement, the polarization converting element 384 is a unit, wherein two polarization converting elements for R light and G light are placed one over the other in the propagating direction of light of the respective colors.

Figure 19A:
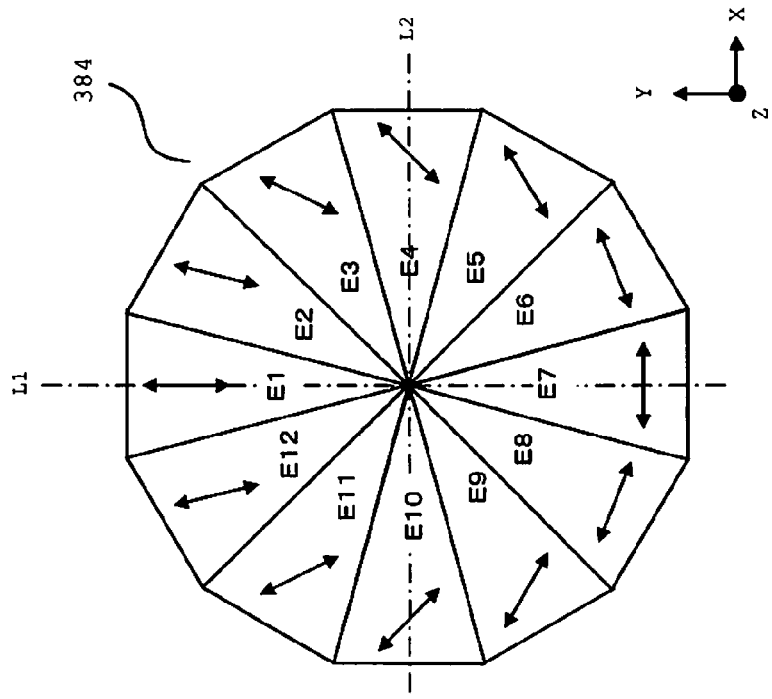
FIGS. 19A and 19B are diagrams respectively showing arrangements of polarization converting elements in the fourth embodiment.
Figure 19B:
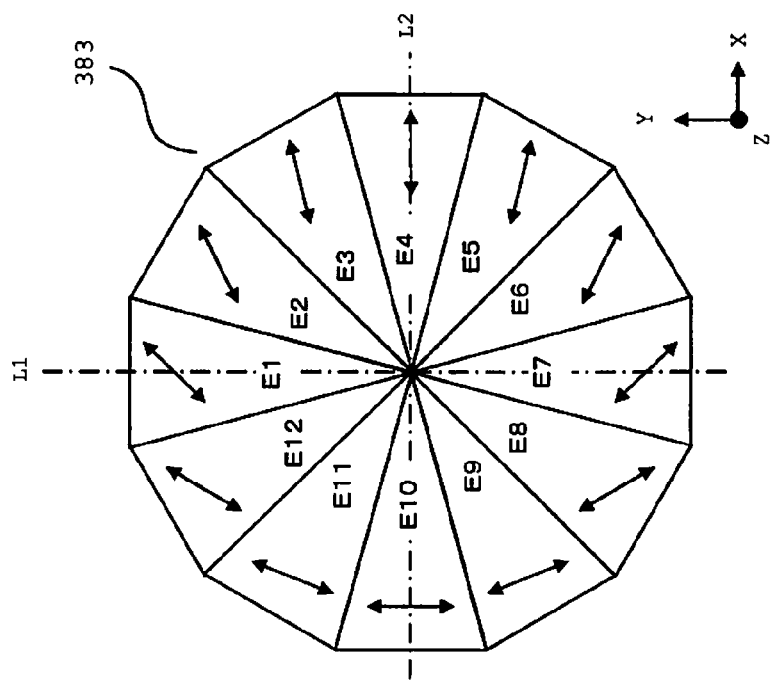

FIGS. 19A and 19B are diagrams showing the directions of anisotropic axes on the polarization converting elements 383 and 384, respectively. The directions of anisotropic axes in areas E1 through E12 are indicated by the arrows in FIGS. 19A and 19B. FIG. 19A shows the directions of anisotropic axes on the polarization converting element 383 for G light, and FIG. 19B shows the directions of anisotropic axes on the polarization converting element 384 for R light, B light.

In the case where G light whose polarization direction is aligned in parallel to X-axis direction in FIG. 19A is incident onto the polarization converting element 383 shown in FIG. 19A, the polarization direction of light is converted into a direction substantially radially extending from the center of the polarization converting element 383. Likewise, in the case where R light, B light whose polarization direction is aligned in parallel to Y-axis direction in FIG. 19B is incident onto the polarization converting element 384 shown in FIG. 19B, the polarization direction of light of the respective colors is converted into a direction substantially radially extending from the center of the polarization converting element 384.

The center of the polarization converting element 383, 384 having the above arrangement is in agreement with the center of the optical axis of the refracting optical system 39, and anisotropic axes L1 and L2 in FIGS. 19A and 19B are respectively aligned in parallel to Y-axis and X-axis in FIG. 18. Thereby, the polarization direction of R light, G light, B light (i.e. modulated light) in incidence onto the refracting optical system 39 is converted into a direction radially extending from the center of the optical axis of the refracting optical system 39 by the polarization converting element 383, 384.

Similarly to the second embodiment, in this embodiment, R light, G light, B light (i.e. modulated light) is allowed to be incident onto the refracting optical system 39 in a state that the polarization direction of the modulated light radially extends from the center of the optical axis of the refracting optical system 39. This enables to make the intensity distribution of light transmitted through the refracting optical system 39 substantially uniform, and enhance light use efficiency of R light, G light, B light (i.e. modulated light). Thereby, an image having a uniform brightness can be projected onto a projection screen.

The embodiment is advantageous, as compared with the second embodiment, because the half wavelength plate 381 can be omitted. This enables to simplify the arrangement and reduce the production cost. It is needless to say that the arrangement of this embodiment is applicable to the third embodiment.

Alternatively, in this embodiment, as shown in FIG. 7A, the light incident area of the polarization converting element 40 may be divided into a number of smallest areas, and anisotropic axes having directions satisfying that the polarization direction after conversion is aligned with a radial direction may be defined in each of the smallest areas ΔE obtained by division.

The embodiments of the present invention have been described as above, but the present invention is not limited to the foregoing embodiments. Also, the embodiments of the present invention may be changed or modified in various ways other than the above.

For instance, in the second embodiment or the third embodiment, R light, G light, B light is modulated by the corresponding imager, and the light after modulation is combined by the dichroic prism. Alternatively, light of a wavelength other than the wavelengths of R light, G light, and B light may be modulated by a corresponding imager, and the light after modulation may be combined with B light, G light, and R light for incidence onto the refracting optical system 39.

In the foregoing embodiments, a transmissive imager is used as an imager for modulating light of the respective colors. Alternatively, a projector incorporated with a reflective imager may be applied to the invention. Also, a method other than the method disclosed in the foregoing embodiments may be applied, according to needs, concerning an arrangement as to which imager for light of the respective colors is to face which plane of the dichroic prism 37. For instance, the imager 26 for B light and the imager 36 for R light in FIG. 12 may be replaced from each other in such a manner that B light is allowed to be incident onto the corresponding imager via the lenses 31 and 33.

In the arrangement examples of FIGS. 8 and 10, B light and R light are incident onto the dichroic prism 37 as S-polarized light, and G light is incident onto the dichroic prism 37 as P-polarized light, considering the reflection efficiency and the transmitting efficiency of the dichroic prism 37. Alternatively, in the case where requirements on the reflection efficiency and the transmitting efficiency of the dichroic prism 37 based on a polarization direction are not considered, light of the respective colors may be allowed to be incident onto the dichroic prism 37 in any polarization state. In the modification, the half wavelength plate 30 may be omitted in the arrangements of FIGS. 8 and 10.

In the case where light of the respective colors is allowed to be incident onto the dichroic prism 37 in any polarization state as described above, polarization converting elements for R light, G light, and B light may be arranged between the imagers 26, 29, and 36; and the dichroic prism 37, respectively, without the need of providing the polarization converting element 382 at a position posterior to the dichroic prism 37, as described above. In the modification, the polarization converting elements for light of the respective colors are configured and arranged in such a manner that the polarization direction of light of the respective colors after combination by the dichroic prism 37 radially extends from the center of the optical axis of the refracting optical system 39.

The embodiments of the present invention may be changed or modified according to needs, as far as such changes and modifications do not depart from the scope of the present invention hereinafter defined.

What is claimed is:

1. A projection display device for projecting an image on an imager, comprising:
   a light guiding optical system configured to guide illumination light to the imager;
   a projecting optical system configured to project modulated light modulated by the imager, wherein the projecting optical system includes a refracting optical system and a reflecting optical system configured to reflect the modulated light transmitted through the refracting optical system; and
   a polarization converting part of a polarization converting unit configured to convert a polarization direction of the modulated light, wherein the polarization converting part has a plurality of areas that together are less than a total number of areas of the polarization converting unit, each area has different directions of anisotropic axes, wherein a boundary of the areas is perpendicular to an optical axis of the refracting optical system, wherein the reflecting optical system is displaced from a center of the optical axis of the refracting optical system, and the polarization converting part is displaced from the center of the optical axis of the refracting optical system in a direction opposite to a direction to which the reflecting optical system is displaced from the center of the optical axis of the refracting optical system, and
   wherein the modulated light is irradiated on only the polarization converting part that corresponds to a subset of areas of the polarization converting unit, in which the subset of areas that corresponds to the polarization converting part is less than the total number of areas of the polarization converting unit, and wherein the polarization converting part converts the polarization direction of the modulated light incident thereon.

2. The projection display device according to claim 1, wherein
   the anisotropic axes are symmetrically aligned with respect to a line.

3. The projection display device according to claim 1, wherein
   the polarization converting part has a plurality of boundaries of areas, and the optical axis of the projecting optical system is coaxially aligned with an intersection of plurality of boundaries of areas.

4. The projection display device according to claim 1, wherein
   the polarization converting part is arranged between the imager and the projecting optical system.

5. The projection display device according to claim 1, wherein a center of the polarization converting part is displaced from a center of the polarization converting unit.

* * * * *